United States Patent
Porterfield

(12) 
(10) Patent No.: US 6,513,154 B1
(45) Date of Patent: Jan. 28, 2003

(54) SYSTEM AND METHOD FOR TESTING OF COMPUTER PROGRAMS IN PROGRAMMING EFFORT

(76) Inventor: John R. Porterfield, 1998 Broadway #1104, San Francisco, CA (US) 94109

( * ) Notice: Subject to any disclaimer, the term of this patent is extended or adjusted under 35 U.S.C. 154(b) by 0 days.

(21) Appl. No.: 08/955,163

(22) Filed: Oct. 21, 1997

Related U.S. Application Data

(60) Provisional application No. 60/028,911, filed on Oct. 21, 1996.

(51) Int. Cl.[7] ............................................. G06F 9/44
(52) U.S. Cl. ...................................................... 717/101
(58) Field of Search ................................ 395/704, 712, 395/703; 364/578, 400; 705/400; 706/45, 425; 717/101

(56) References Cited

U.S. PATENT DOCUMENTS

| | | |
|---|---|---|
| 4,558,413 A | 12/1985 | Schmidt et al. |
| 4,696,003 A | 9/1987 | Kerr |
| 4,809,170 A | 2/1989 | Leblang et al. |
| 4,819,233 A | 4/1989 | Delucia et al. |
| 4,942,527 A | 7/1990 | Schumacher |
| 5,016,170 A | 5/1991 | Pollalis et al. |
| 5,172,313 A | 12/1992 | Schumacher |
| 5,175,856 A | 12/1992 | Van Dyke et al. |
| 5,193,180 A | 3/1993 | Hastings |
| 5,212,794 A * | 5/1993 | Pettis et al. ................... 395/700 |
| 5,231,577 A | 7/1993 | Kess |
| 5,301,270 A | 4/1994 | Steinberg et al. |
| 5,303,146 A | 4/1994 | Ammirato et al. |
| 5,313,616 A | 5/1994 | Cline et al. |
| 5,359,710 A | 10/1994 | Aono et al. |
| 5,386,547 A * | 1/1995 | Jouppi ........................ 395/425 |
| 5,410,648 A | 4/1995 | Pazel |
| 5,450,586 A | 9/1995 | Kozara et al. |
| 5,452,440 A * | 9/1995 | Salsburg .................... 395/463 |
| 5,483,468 A | 1/1996 | Chen et al. |
| 5,490,097 A | 2/1996 | Swenson et al. |
| 5,513,305 A | 4/1996 | Maghbouleh |

(List continued on next page.)

OTHER PUBLICATIONS

Microsoft Corporation Source Profiler User's Guide pp. 1–72, 1993.*

Turbo Pascal Built in Debugger Version 5.0 pp. 19–38, 101–193, 1988.*

Ambler et al., Influence of Visual Technology on the Evolution of Language Environments, Computer, 1989, pp. 9–22.

Austin et al., "Efficent Detection of All Pointer and Array Access Errors." University of Wisconsin–Madison, Computer Sciences Department, 1993, Madison, Wisconsin.

(List continued on next page.)

*Primary Examiner*—Gregory Morse
*Assistant Examiner*—Todd Ingberg

(57) ABSTRACT

A system coordinates software development activities with planning documents (e.g. Gantt charts). Planning documents are created and/or edited to reflect the structure of underlying code by assigning module and procedures to task lines. Further enhancements of the invention provide mechanism for manager to know where coder(s) are stuck or ignoring code. A monitor process on the developer's computer identifies exception generating code, and integrating bug lists from disparate sources into one unified planning document. The information used to generate the planning document is used to provide a mechanism of transferring that links bugs, code, and intent in one package. The system is extended to provide automated defect detection and correction, particularly in the areas of run-time exceptions, endless loops, control flow errors, data errors, and errors caused by breaking working code with later edits. The combination of the invention's code driven management paradigm and automated debugging mechanism provides an enhanced mechanism for sharing knowledge among developers.

28 Claims, 40 Drawing Sheets

U.S. PATENT DOCUMENTS

| | | | |
|---|---|---|---|
| 5,535,329 A | | 7/1996 | Hastings |
| 5,572,671 A | | 11/1996 | Eisenberg et al. |
| 5,574,828 A | | 11/1996 | Hayward et al. |
| 5,634,022 A | | 5/1997 | Crouse et al. |
| 5,649,200 A | | 7/1997 | Leblang et al. |
| 5,664,191 A | * | 9/1997 | Davidson et al. ............ 395/670 |
| 5,675,801 A | | 10/1997 | Lindsey |
| 5,675,802 A | | 10/1997 | Allen et al. |
| 5,689,712 A | * | 11/1997 | Heisch ....................... 395/704 |
| 5,694,539 A | | 12/1997 | Halay et al. |
| 5,701,139 A | | 12/1997 | Weinberg et al. |
| 5,729,676 A | | 3/1998 | Inoue |
| 5,729,744 A | | 3/1998 | Gerken et al. |
| 5,732,212 A | | 3/1998 | Perholtz et al. |
| 5,732,273 A | | 3/1998 | Srivastava et al. |
| 5,734,908 A | | 3/1998 | Chan et al. |
| 5,790,778 A | | 8/1998 | Bush et al. |
| 5,790,858 A | * | 8/1998 | Vogel .......................... 395/704 |
| 5,806,078 A | | 9/1998 | Hug et al. |
| 5,857,071 A | | 1/1999 | Haley et al. |
| 5,860,007 A | | 1/1999 | Soni et al. |
| 5,860,011 A | | 1/1999 | Kolowa et al. |
| 5,940,617 A | | 8/1999 | Tamura |
| 5,960,196 A | | 9/1999 | Carrier et al. |
| 5,968,113 A | | 10/1999 | Haley et al. |
| 5,974,391 A | | 10/1999 | Hongawa |
| 5,974,572 A | | 10/1999 | Weinberg et al. |
| 5,987,249 A | | 11/1999 | Grossman et al. |
| 6,003,143 A | | 12/1999 | Kim et al. |
| 6,016,474 A | | 1/2000 | Kim et al. |
| 6,026,362 A | | 2/2000 | Kim et al. |
| 6,038,538 A | | 3/2000 | Agrawal et al. |
| 6,038,543 A | | 3/2000 | Kurosawa |
| 6,042,614 A | | 3/2000 | Davidson et al. |
| 6,061,518 A | | 5/2000 | Hoffman |
| 6,074,434 A | | 6/2000 | Cole et al. |
| 6,085,029 A | | 7/2000 | Kolowa et al. |
| 6,092,050 A | | 7/2000 | Lunaren et al. |

OTHER PUBLICATIONS

Beguelin et al., "Visualization and Debugging ina Heterogeneous Environment." Computer, 1993, pp. 88–95, IEEE.

Beizer, Boris, Software Testing Techniques, 2$^{nd}$ Edition. 1990, Van Nostrand Reinhold, New York, New York. pp. 59–60, 70–77, 145, 150–172.

Boehm, Barry M. Software Engineering Economics, 1991, Prentice–Hall, Upper Saddle River, New Jersey.

Bourdoncle, François. "Abstract Debugging of Higher––Order Imperative Languages." ACM Sigplan, 1993, ACM, pp. 46–55.

Chan et al. "AIDA–13 A Dynamic Data Flow Anomaly Detection System for Pascal Programs." Software Practice and Experience, 1987, vol. 17(3), pp. 227–239.

Forgacs, Istvan. "Double Iterative Framework for Flow–Sensitive Interprocedural Data Flow Analysis." ACM Transactions on Software Engineering and Methodology, vol. 3, No. 1, 1994, pp. 29–55.

Frankl et al. "An Applicable Family of Data Flow Testing Criteria." IEEE Transactions on Software Engineering, vol. 14, No. 10, 1988, pp1483–1498.

Fritzson et al. "Generalized Algorithmic Debugging and Testing." ACM Sigplan '91 Conference on Programming Language Design and Implementation, 1991, pp. 317–326.

Gupta, Rajiv. "Optimizing Array Bound Checks Using Flow Analysis." ACM Letters on Programming Languages and Systems, 1993, vol. 2, Nos. 1–4, pp 135–150.

Hopcroft et al. "Efficient Planarity Testing." Journal of the ACM, vol. 21, No. 4, 1974, pp. 549–568.

Huang, J. C. "Detection of Data Flow Anomaly Through Program Instrumentation." IEEE Transactions on Software Engineering, vol. SE–5, No. 3, 1979, pp. 226–236.

Kessler, Peter B. "Fast Breakpoints:Design and Implementation." Proceedings of the ACM Sigplan '90 Conference on Programming Language Design and Implementation, 1990, pp. 78–84.

Korel, Bogdan. "Automated Software Test Data Generation." IEEE Transactions on Software Engineering, vol. 16, No. 8, 1990, pp. 870–879.

Laski et al. "A Data Flow Oriented Program Testing Strategy." IEEE Transactions on Software Engineering, vol. SE–9, No. 3, 1983, pp. 347–354.

Linton, Mark E. "The Evolution of Dbx. " Proceeding of the Usenix Summer 1990 Technical Conference, 1990, pp. 211–220.

Mangano, Salvatore R. "Algorithms for Directed Graphs." Dr. Dobbs Journal, 1994, pp. 92–147.

Nicollin et al. "Compiling Real–Time Specifications into Extended Automata." IEEE Transactions on Software Engineering, vol. 18, No. 9, pp. 794–804.

Peters, Kathleen. "Software Project Estimation".

Fairly, Richard E. "A Guide for Preparing Software Management Plans." Software Engineering Project Management, IEEE Computer Society Press, 1988, pp 257–264.

* cited by examiner

```
        i = 0
        j = 0
  △     x = 0
        While (i < 10)      — 135
  □        △  While (j < 10)  — 136
              □      x = x + 1  — 137
              ⬠   End While  — 138
              i = i + 1
        End While
  ⬠
```

Legend

SYSTEM AND METHOD FOR TESTING OF COMPUTER PROGRAMS IN PROGRAMMING EFFORT

REFERENCE TO RELATED APPLICATIONS

This application claims the benefit of provisional application No. 60/028,911 filed on Oct. 21, 1996. Provisional application No. 60/028,911 is hereby incorporated herein by reference in its entirety.

FIELD OF THE INVENTION

The field of the present invention relates in general to a system and method for automatically tracking, measuring, and facilitating the progress of software development in a digital computer system. In particular, the present invention relates-generally to software development management systems; particularly Gantt chart software, defect tracking systems, and debuggers by providing a code based software development management and automated debugging system.

BACKGROUND OF THE INVENTION

The management of software development is a new and difficult discipline. The inadequacy of software management techniques is demonstrated by repeated studies showing that at least seventy percent of all software projects are never completed. Without detailed, accurate measurement, runaway development costs, particularly in large organizations, are difficult to detect and stop. To track all the aspects of a project accurately, software development managers need an ongoing awareness of each developer's activities, the option to transfer sections of code easily from one developer to another, and measurable criteria on which to base shipping decisions. The development process still costs at least one hundred dollars per line of code, with a typical software project containing thousands of lines of code; As development progresses, costs go up as a manager's ability to effectively manage the project goes down.

Most managers rely on Gantt charts to track a project's progress. However, Gantt charts require regular manual updating in order to accurately reflect the progress of the project. Managers, when under pressure to complete software, neglect to update the Gantt chart, making the Gantt chart irrelevant. Even if Gantt charts are updated regularly, they are of limited use because they are based on what people say: genuine complexity and technical-jargon make code overwhelmingly intimidating for anyone but its author to understand. Consequently, one of the few aspects of a modem large business enterprise that cannot be audited is software development.

Further, every time code is changed ("versioned"), its behavior will change in a way that cannot be predicted. Most of these changes produce intended and beneficial behavior, but some produce neither beneficial nor intended behavior. Erroneous, detrimental or deleterious behaviors are common called bugs. Bugs, which are introduced by new versions, are often not detected until long after they are introduced. Bugs remain undetected because most users have neither the time nor the tools to run regression tests, which check that working code remains working after it's been changed.

Automated version control systems have been an integral part of software engineering for many years. They attempt to address the above noted, intrinsic problems of code development by essentially providing a data store for versions of code. Prior art enhancements to version management do notify managers about code changes, but don't teach how to use version derived information to update Gantt charts.

Developer's Information Monopoly

The central underlying problem is the developer's monopoly on information. If two developers (A and B) have the same level of skill, developer A cannot easily understand B's code and vice-versa. Therefore, only A can effectively work on A's code. This is what will hereafter be referred to as the "developer's monopoly on information." Previous enhancements to version control systems have attempted to break the developer's monopoly on information by forcing developers to enter reasons for entry and/or linked this with "diffs" (versions with textual differences highlighted) of the code, but these systems are limited by forcing the developer to manually explain the reasons for the changes. Further, these enhancements don't teach how to derive the developer's intent directly from the code.

Problems of the Individual Developer

Code is so complicated that it is extremely difficult for an individual engineer to maintain quality as it evolves. Bugs, new and existing, are one of the most unavoidable, annoying, and time-consuming problems in the development of code. Each bug is unique, which is why there have been no successful automated debugging tools. However, bugs can be grouped into general classes:

Crashes: Crashing is the most severe, and one of the most common, errors. Developers often don't know what caused a crash, so cannot reproduce and fix the problem. In addition, developers will sometimes leave crashes in a program in the rush to ship code.

Endless Loops: Developers often accidentally write endless loops. When a program hits an endless loop, it continues to run/loop until the program (or the computer) is shut off. Endless loops are particularly time consuming because the developer doesn't know the cause, and may assume the program is just being slow instead of endlessly looping; Therefore, discovering endless loops takes a great deal of time.

A Statement Is Not Executed When It Should Be: One of the most common types of discrepancies is that a statement (line of code) will not be executed under conditions where the developer intended that it should. Sometimes these bugs are simple to solve, but, when they aren't, their causes can take hours to find.

Bad Data: An even more time consuming-type of bug is finding out why a particular number or other piece of data is not what it should be. Sometimes the reason is simple, but often the number that shows up incorrect is the result of a calculation that occurred incorrectly somewhere else in the program. This incorrect calculation causes a chain reaction that manifests itself in the bad data that was originally detected. The developer must laboriously track this chain of data back to its source.

Something That Used To Work No Longer Does: Developers frequently make changes in code that breaks previously working code; This often happens when a developer is editing the code to address a problem in one area and does not anticipate the effects of the edit on other areas of functionality. Regression tests, well described in prior art, are an attempt to catch these types of inadvertently created bugs. However, regression tests only provide pass/fail information and do not pinpoint the edit that caused the break-. Further, the demands of development consume the time that developers might use to go back and test thoroughly. While quality assurance organizations have banks of regression tests that are automatically run, these require releasing the code to QA: so, they aren't run on the code while it's being developed.

Transferring Code is Difficult

The developer's information monopoly applies not only to managers but also to other developers. This monopoly makes it hard to take over another developer's code, especially-when the original developer is not available to explain the code. Most developers taking over the project will look at the code, and say it needs a rewrite (because they write differently). This rewriting is likely to introduce new bugs, making the program less solid than it was when transfer occurred.

Code transfer is a common, and expensive, software management problem. While many academic and commercial attempts to solve this problem have been tried, no successful automated system for code transfer has been developed.

Application Ser. No. 08/955,028 filed Oct. 10, 1997 (now abandoned) by the assignee herein provided beneficial features of "automatic bugs" and is incorporated herein by reference. Application Ser. No. 08/955,835 file Oct. 10, 1997 (now abandoned) by the assignee herein provided beneficial features of "the monitor process" and is incorporated herein by reference. Application Ser. No. 08/955,163 file Oct. 10, 1997 (now abandoned) by the assignee herein provided beneficial features of "Implicit Ul Test" and is incorporated herein by reference. Application Ser. No. 08/956,651 file Oct. 10, 1997 (now abandoned) by the assignee herein provided beneficial features of "transfer to another developer" and is incorporated herein by reference. Application Ser. No. 08/954,935 file Oct. 10, 1997 (now abandoned) by the assignee herein provided beneficial features of "revert until broken bug" and is incorporated herein by reference.

SUMMARY OF THE INVENTION

Living Gantt chart

Living Gantt chart expands project management software based on the Gantt chart. FIG. 1 shows a block diagram of a data processing system for software development, which may be utilized to implement the present invention. Using the Gantt chart editor (Microsoft Project in exemplary embodiment) 5 on his computer 2, the manager 1 accesses the Modified Planning Document 7. The invention 6 accesses the modified planning document by extending the user interface of the Gantt chart editor. The invention stores its representation of Gantt chart in the data store 8. While the block diagram shows that the data store is accessible over the network, it can also be local to the manager's computer.

Each task line on the Living Gantt chart can be "linked" to a particular module, procedure, crash, test or other items that the invention extracts from the structure and/or behavior of the target code. The manager can link these code-generated items with non-specific human generated tasks on the Gantt chart. Once this link is established, the invention automatically maintains it. Neither the developer nor the manager needs to manually maintain the Living Gantt chart; it updates itself when the manager opens the Gantt chart. Living Gantt chart also allows senior management and other nontechnical team members to view a project's progress. This information allows them to be able to plan accurately and to coordinate software development activities with marketing campaigns, sales forecasts, and revenue projections.

Modified Planning Document

The most fundamental capability of Living Gantt chart is to create "planning documents" (Gantt charts in the exemplary environment) which consist of abstract "tasks" from code. The code under development is called the "target code", which is being developed by "developer(s)". The "manager" informs the invention of the target's code location. The invention parses the target code into modules and procedures. The invention then creates a hierarchically organized planning document. The invention turns code into Gantt charts. Gantt charts derived from code are called "derived planning documents."

The structure of the derived planning document and the target code are stored-in a persistent "data store". The invention maintains versions of the target code in the data store. Versions are maintained for the target code such that versions of modules and procedures are retrievable and comparable. Using the versions of target code stored in the data store, the invention tracks the development in the derived planning document, which is now referred to as the "modified planning document". The invention extends the capabilities of the modified planning document by letting the developer match items in existing planning documents with selected parts of the target code. For example, a procedure p in module m might be linked to a Gantt chart task "develop customer service form".

The invention uses the linkage between "tasks" and elements of the target code to update the modified planning document. The invention compares individual linked target code elements to determine where progress is actually being made, and points which are not advancing. Active code is easily identified as the code most recently edged.

The invention allows managers to see dusty projects (those that have not been touched in a designated period of time) or "untouched" projects (those that have never been worked on at all).

The invention compares versions of procedures to show when the engineer makes repeated and/or frequent edits. If the developer keeps cycling between edits over a period of days, it identifies the few lines of code that management is spending the most resources on and that the engineer is least able to address. Tasks linked to "stuck" target code elements are marked on the modified planning document. If linked tasks are bound to new code elements, that code is marked new.

Automated Debugging

Almost all bugs fall in one of four categories:

Crash Bug—When run, the target code generates an unhandled exception ("crashes").

Loop Bug—The code waits forever ("hangs").

Control Flow Bug—The code does the wrong thing ("control flow"); that is, the code does not execute the statements the developer expects.

Data Bug—The code runs correctly, but one or more the target code's variables or outputs are set to a value that developer doesn't expect.

The invention provides mechanisms for automating finding the causes of and suggesting solutions of these four types of bugs.

Crash Bug

The invention needs to detect crashes when they happen, which is done by the "monitor process". In addition to providing a context for the invention, FIG. 1 also shows how a developer 3 uses the invention as well as how the invention interacts with the other elements of the developer's computer 4. The developer edits the target code 11 via the development environment (Microsoft Visual Basic in the exemplary embodiment) 9. The invention's monitor process 10 extends the development environment, which detects the developer's actions. The invention's instrumented nerves 12 provide information from the running program to the monitor process.

When the monitor process detects that the target code crashes, it determines the element (module, procedure, and statement) of the target code that the operating system's exception handler provides. These entries provide a key into the data store for an object referred to as a "crash-bug." Each time the target code crashes; the circumstances of the crash (date, time, user, computer name, etc.) are added-to the data store.

Since exceptions codes for any particular operating system and programming language are well defined, the cause and most common solutions to crashes can be determined. The invention maintains a set of "language specific analyzers" for a subset of the exceptions generated by the development environment and/or operating system.

When the invention's monitor process detects a crash, the statement that caused the crash is analyzed by the language specific analyzer, for the specific exception. The language specific analyzer parses the statement to 1) generate a hypothesis about the cause of the crash, 2) suggest code to prevent the crash recurring the next time this statement is reached, and/or 3) present a strategy for investigating indirect causes of the exception.

By suggesting analysis and solutions to crashes when they happen, the developer also benefits from the target code in being able to solve problems faster. In addition, the language specific analyzers provide a mechanism for applying the collective knowledge of developers, not just in documentation, but also on the crash as it is happening.

Information about the crash bug is available to the manager browsing the modified planning document, by accessing details of the tasks linked to automatic crash bugs. The invention provides forms in the Gantt chart editor that let the manager retrieve the circumstances of the crash, the target code itself, and how the developer decided to respond to the crash. The ability to view the areas of the target code as well as a history of its run-time behavior is referred to as "drilling down to the code."

Implicit Ul Test

When the target code crashes, the developer is often left in the unenviable position of being functionally unable to repeat the failure. Without the ability to reproduce the events leading up to the crash, the developer is severely handicapped in any attempts to understand, let alone correct the program flaw.

The monitor process records the sequence of the user's Ul actions. Note that monitor process may or may not incorporate third-party tools for recording Ul tests, the implicit nature of the test is what is not specified in prior art. The invention assumes that every run might end in a crash, and begins to record actions as soon as it detects that the developer has started the target code. If the target code crashes, the sequence of actions is placed in the data store and labeled as an "Implicit Ul Test."

Since Implicit Ul tests are associated with each crash, they are also available for display in the modified planning document, either as individual Hems and/or as child tasks to crash bugs.

Loop Bug

Effectively endless loops are a time consuming class of bug. Unfortunately, they are a provably intractable annoyance: the body of computer science theory includes proofs that there is no way to predict when any arbitrary loop will exit, or, in fact, if it will exit at all. A loop that has iterated several million times may exit on the next pass. It is often impossible to tell for sure. However, the distribution of behavior among loops in actual code affords a heuristic loophole that the exemplary embodiment capitalizes on: most loops terminate relatively early on. Thus, the exemplary embodiment uses nerves to keep track of how many times a given loop has iterated since it was entered, and halts execution if the number of iterations passes a threshold. Since the threshold is predetermined by the developer, and the behavior may be disabled or customized on a loop by loop basis, this is a reasonable approximation to effective 'infinite' loop detection.

To intercept endless loops, the invention adds the step of instrumenting the code with a set of function calls termed "nerves". Instrumenting code is the insertion of statements that are placed there solely to monitor the run-time behavior.

Inserting the C/C++ assert statement is one of the most common types of instrumention. Several other inventions have taught instrumenting code for finding memory leaks, but "nerves" are used for control flow debugging. Loop Bug uses the initLoop, checkLoop, and endLoop nerves.

The invention instruments each loop in the target code by putting an "initLoop" nerve before loop entry, a "checkLoop" nerve at the loop iterator, and an "endLoop" nerve at each loop exit. Each time the loop iterates the checkLoop nerve is called. The checkLoop nerve maintains a count of how many times a "target loop" executes. If the count exceeds a threshold, the invention interrupts the target code's execution.

It then reports to the developer that it is suspects that the loop is endless and displays a set of options for 1) rewriting the code so the loop will not be endless, 2) raising the threshold, 3) marking the loop as one which is intentionally endless (e.g. a message handling loop). The loop bug information includes the loop's location in the code, the iteration count, when the loop was written and the action taken by the developer. Loop bugs are reflected in the modified planning document in a manner similar to crash bugs.

Control Flow Bug

The invention's method for detecting loops is further extended to finding why the target code follows unexpected control flow paths. The invention expresses this with a control flow bug. The developer selects a statement of the target code that should be called when the target code is executed.

The invention instruments the target code with traceEnter (at procedure entry), traceExit (at procedure exit) and traceBranch (for if/then/else and switch statements). Loops are already instrumented as described above. CheckLoop nerves function as traceBranch nerves when control flow bugs are being run. The developer then executes the target code. The nerves compile a record of the target code's execution, called the "proximal control trace". The invention uses the proximal control trace to report to the developer if the procedure is even called, or failing this if any procedure calling the procedure is called.

If the target code has entered the procedure, the invention determines how "close" the execution got to the target statement. "Closeness" is measured by the number of statements between the procedure entry point and the target statement. The invention then identifies the branch statements (including loop statements). From this information the invention then generates a hypothesis that the target statement would have been called had the intervening branches been executed. The expression that prevented the statement from being called is the immediate cause of the bug.

If there are no branches between the target statement and the closest extent of the proximal control trace, the code is instrumented by traceCheckpoint nerves on each statement between the proximal control trace and the target statement. The last traceCheckpoint nerve that is executed points to the statement that caused the bug.

If the selected procedure has not even been called, there are two subcases: the procedure is "public" (available to be called externally); or private (not available to be called externally). Each statement that references the target procedure is instrumented. The list is presented for refinement to the developer. Each selection recursively generates a new "find why not called" bug.

If the selected procedure is public, the code may simply not be called eternally Private calls can be instrumented, but this is not the limitation of the invention's capabilities in this area.

After the invention finds the proximal control trace, it suggests the source of the bug to the developer by displaying the expression along with the current value(s) is presented to the developer along with the choice to change the Boolean value to force the branch to be executed.

The invention then presents a visual representation of the branches along with its hypothesis that incorrect decisions were made at the intervening branch(es). The developer is then invited to edit the branch along with some suggested code. The invention's formation of hypotheses differs from prior art in that it is based on actual data from running program as opposed to syntactic analysis or simulation.

Automated testing permits the invention to not only form but also test hypotheses. The tests available to the developer include, but are not limited to, Implicit UI tests. The invention integrates tests from its own UI tests in the data store. The invention stores hierarchies of tests such that they can be executed in their entirety or as sub-nodes. The tests are also extensible to include external tests provided they return a Boolean value.

Since each bug has a related test, the invention forms testable hypotheses about what the underlying cause of the bug is. If a developer takes one of the suggestions, the invention makes the edit and then reruns the test. If the statement is executed, the bug is marked fixed. This automated detect, analyze, suggest/edit, retest cycle greatly reduces the time to find and fix bugs because the only human intervention is to review the analysis and edit.

Data Bug

Find the origin of bad data motivates the fourth type of bug. The invention extends the mechanism used in control flow bugs by adding a target expression. The tracing mechanism of the nerves is used to record the values of local, class, and global variables that contribute to the composition of the target expression. The values of the constituent expression and the target expression constitute the "proximal data tree".

The developer selects a target statement, which generates an incorrect value ("target expression"), and specifies a condition that the expression should be equal, for example, "x< >5" would be what the developer types when the variable "x" is unexpectedly equal to 5. The target expression becomes the root of the proximal data tree.

The invention then parses the procedure containing the target expression, finding statements that reference symbols comprising the target statement. These statements are added to the proximal data tree as descendents of the root node. Previous teachings have shown the limitations of syntactic analysis; so, the invention uses run-time information to fully populate the proximal data tree.

The invention reviews the symbols in the tree and sets watch points so that the run-time values will be reported to the monitor process. When the target statement is executed, the monitor process stops target code execution and populates the proximal data tree, which now contains nodes with run-time values.

The proximal data tree is presented to the developer who then examines the values to identify, the cause of the data bug. The developer then goes to the statement generating the incorrect value and edits, and as with other automated bugs, the invention will retest and check the fix.

If the developer does not have sufficient information to attempt to resolve the bug, he selects nodes and the test is reexecuted; thus, progressively expanding the data node until the source of the bug is found. As each edit is made, the test is reexecuted, and the data tree is updated until the target expression is correct. The data bug is then marked closed.

As with the other automatic bugs, the progress of data bugs is reflected in the modified planning document.

Revert Until Broken Bug

The invention marks certain tests in the data store as regression tests. A test becomes a regression test if it is marked as such by either the developer or manager. Regression testing allows the manager and developer to see if old problems reemerge as the target code progresses. These tests are designated by the developer or the manager as crucial to the success of the project. It is easy to find and read reports of which tests are and are not passing. When all the regression tests are marked as consistently passing, the project is nearing completion.

Regression tests motivated a special type of automatic bug, "a revert until broken bug." This type of bug occurs when edits break regression tests. A revert until broken bug is formed when the developer selects a test. The test is run on the current version. If the test fails, the invention "reverts" the target code to the version that the test passed. If this version passes, the invention goes back to the current version and then steps back version by version until a passing version is found. The version created after the last working version is the version that broke the regression test. The invention "diffs" the working and non-working versions of the target code. This "diff" identifies the particular sets of edits that broke the test.

Previous teachings have automated the correlation of versions with test status; however, these versions had to be explicitly "checked-in" by the developer. Between check-ins, the target code may be edited several hundred times. What the invention teaches is the proactively storing of versions on every edit is necessary to localize the particular edits that broke the test.

Regression Testing and Night Jobs

Regression tests can take a long time to run. The exemplary embodiment provides a mechanism for scheduling and running such jobs during system idle time when the hardware is not actively interacting with a user. The contents and priorities of this queue of idle time tasks, referred to as night jobs, are alterable by the developer.

There are three classes of night jobs currently recognized by the exemplary embodiment.

Coverage analysis: determining which tests call which procedures. Coverage is a straightforward extension of nerve insertion. TraceEnter and traceExit nerves are inserted in all procedures. A test is run and the list of procedures is written to the data store. Coverage is performed by either 1) the developer's choosing to activate it during normal target code execution, or 2) choosing a to run a test as a night job with coverage on.

Regression testing: if a test as marked as a "regression test", it is automatically added to the night job (Automatic addition is however a user selectable option.) If a bug is marked as fixed and a procedure in its coverage path is edited since the last time the test was run successfully, this test is also automatically added as a night job. If a test breaks, the invention automatically creates revert until broken bugs and works them as described earlier.

External tasks: the invention also permits the user to use night jobs to coordinate other tasks that are external to the invention by providing a mechanism for running batch files.

The list of pending night jobs is kept in the data store. After the invention determines that the host computer is idle, all night jobs are placed in a common queue and executed in priority order until their queue is exhausted or until the running of the night jobs is interrupted by the developer. If a night job is interrupted by the developer, the job being executed is marked as interrupted. The results of night jobs are displayable by the developer such that they can be easily rescheduled. The results of night jobs, such as newly broken regression tests, are visible through the Gantt chart.

Combined Bug List and Living Gantt Chart

The invention provides a combined bug list that allows the integration of traditional, text-only "nonautomatic" bugs. Text only bugs can be linked by the developer to automatic bug(s), thus providing another link between the planning document and code. The combined list can include entries from other electronic bug lists. Further, a manager can make modifications in the combined bug list, which provides another avenue. For two-way communication between developer and manager.

Transfer to Another Developer

Developers are commonly assigned to finish, alter, fix, or otherwise work on code written by another person. Unfortunately, taking over work on someone else's code is a difficult proposition at best. Most developers keep much of the state of the code in their heads,even if the previous developer is available for questioning, communicating this information is frequently frustrating. The invention does not solve this problem, but it can lend assistance in a number of areas, making the "new developer's " task of adopting a "previous developer's " code easier.

The invention supports three types of transfer, which the invention meets each of these types of transfer with a different set of mechanisms.

The new developer may be asked to evaluate the state of the previous developer's code. If the new developer has been asked to evaluate the target code, the invention presents test results, regression tests, unresolved crash bugs. The invention obtains a sorted list of procedures, where the procedures are sorted by to present the most recently modified procedures first. The invention presents other filters on this procedure list including procedure length, involvement in bugs, and the number of times a procedure is called during debugging or coverage.

The new developer may be asked to continue where the previous developer stopped. If the new developer is tasked to extend the target code, the invention shows the statements and procedures where the previous developer was working. If the new developer is tasked to extend the capabilities of the target code, the new developer uses the invention to create regression tests by turning on Ul tests while becoming aware of the program capabilities. With the capability, the invention's revert until broken feature allows the new developer freedom to edit with the confidence that inadvertently broken code will be identified early. This information provides a dynamic picture of the code and provides starting points for further investigation.

The new developer may be asked to correct or modify undesirable behavior in the previous developer's code—usually bugs. If the new developer is tasked with debugging, the invention presents the new developer with the combined bug list. This list also has facilities for sorting and filtering these bugs by priority, date created, type, and procedure. The invention looks for regression tests associated with those flawed behaviors.

Finally, as the data store's schema is available, it is also transferable to other data stores which are compatible with other applications, providing more extensive access to the information collected by the invention.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE INVENTION

Living Gantt Chart

Figure 1:
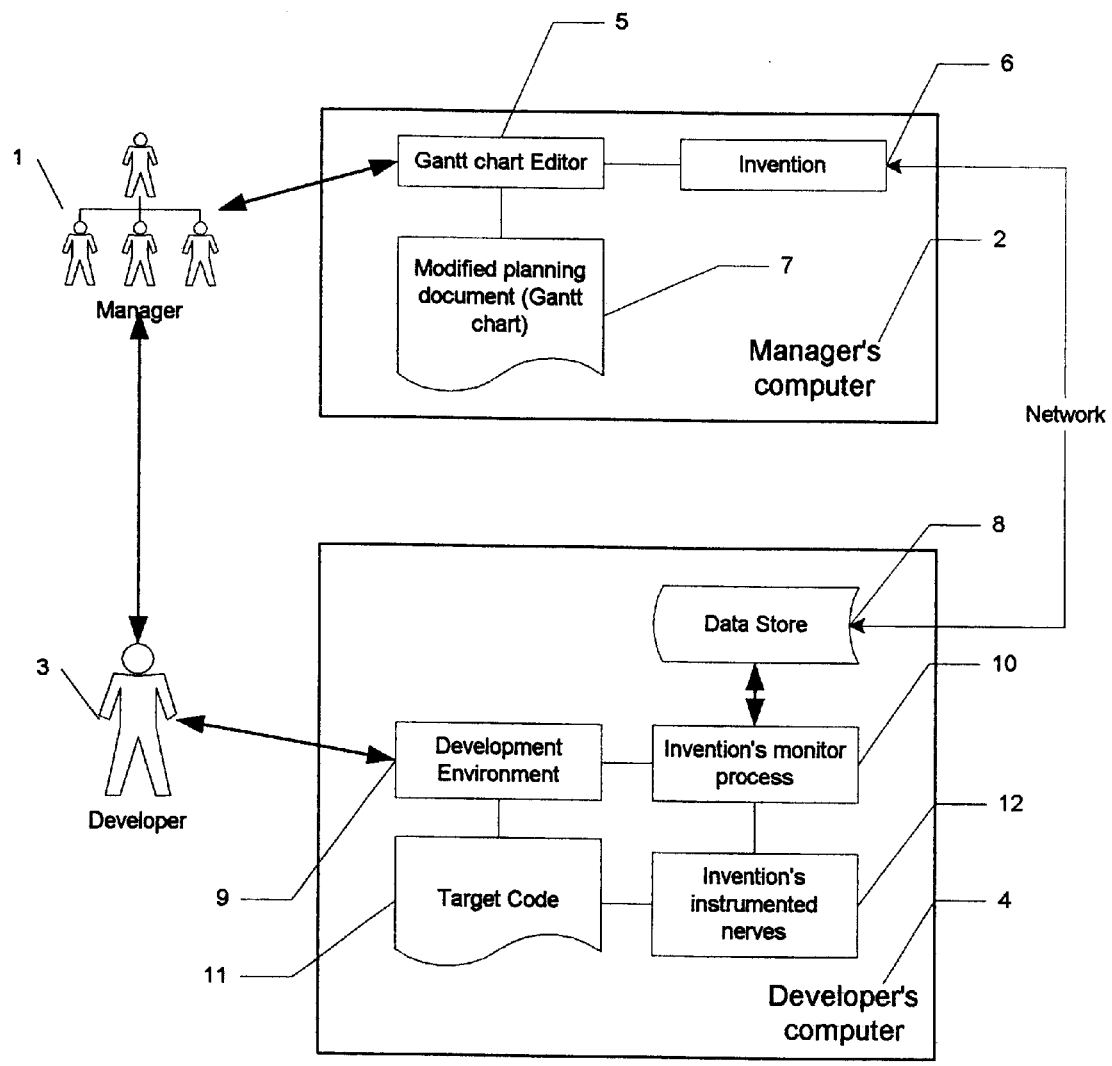
FIG. 1 shows a block diagram of where the invention fits into the software management and development process.
Figure 2:
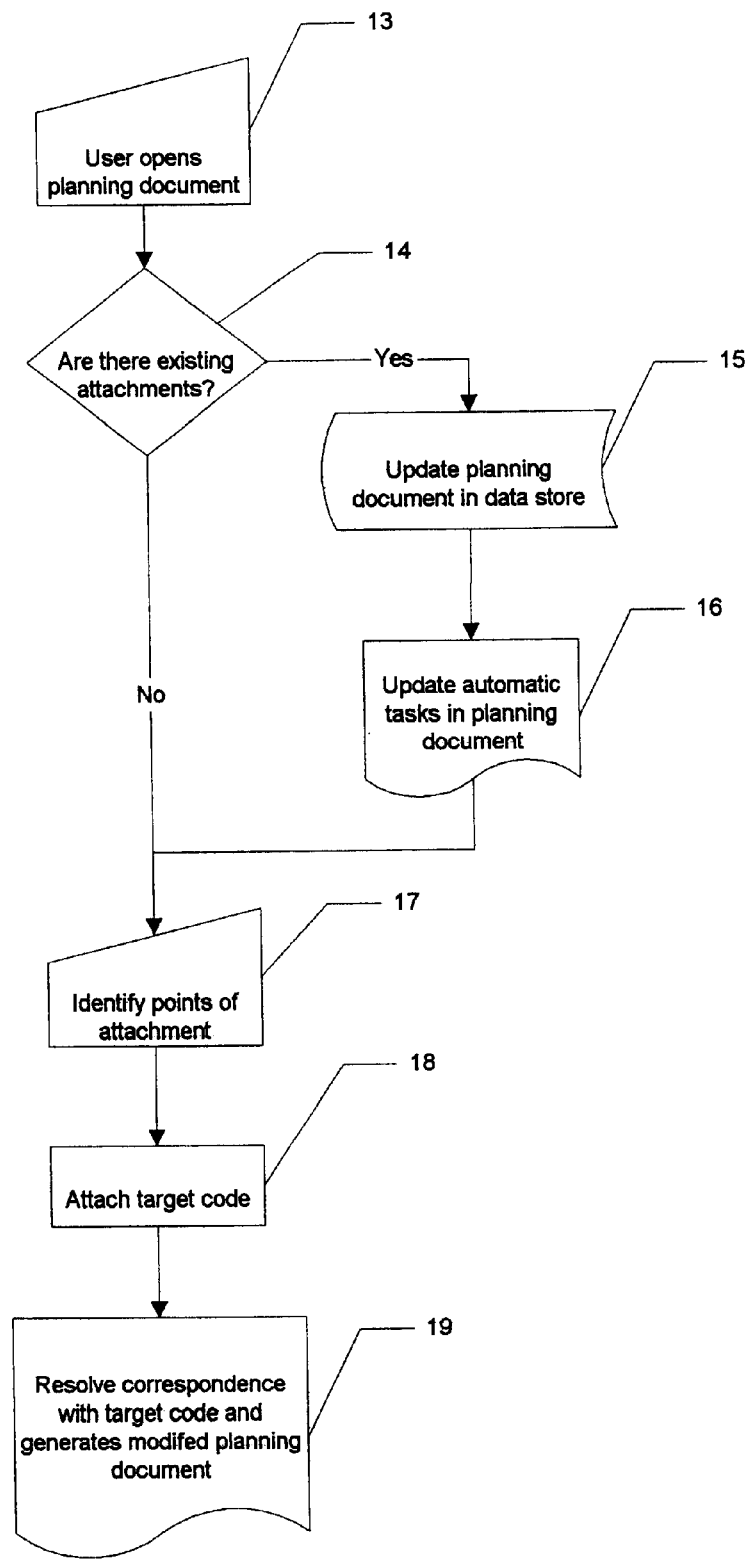
FIG. 2 shows a flow chart illustrating the process of creating the modified planning document from the target code.

An overview of the process of creating the derived planning document from the target code is shown in FIG. 2. In the exemplary embodiment, the Living Gantt chart feature is made available when the manager opens a planning document 13 (Gantt chart) in the planning document editor 5. The invention receives a signal from the planning document editor that initiates placing the planning document in the data store (a Microsoft Access Database in the exemplary embodiment) 14. As part of placing the planning document in the data store 15, automatic tasks (items generated from the target code) are updated 16. The exemplary embodiment then identifies the tasks that the target code is to be attached 18. The invention then deletes the automatic items and generates a structural representation of the target code subsidiary to the points of attachment 17. The modified planning document is then generated and displayed in the planning document editor 18. Finally, the exemplary embodiment resolve correspondence between the target code and planning document, thus generating the modified planning document 19. Blocks 15–19 are described in more detail below.

Modified Derived Planning Document

Figure 3:
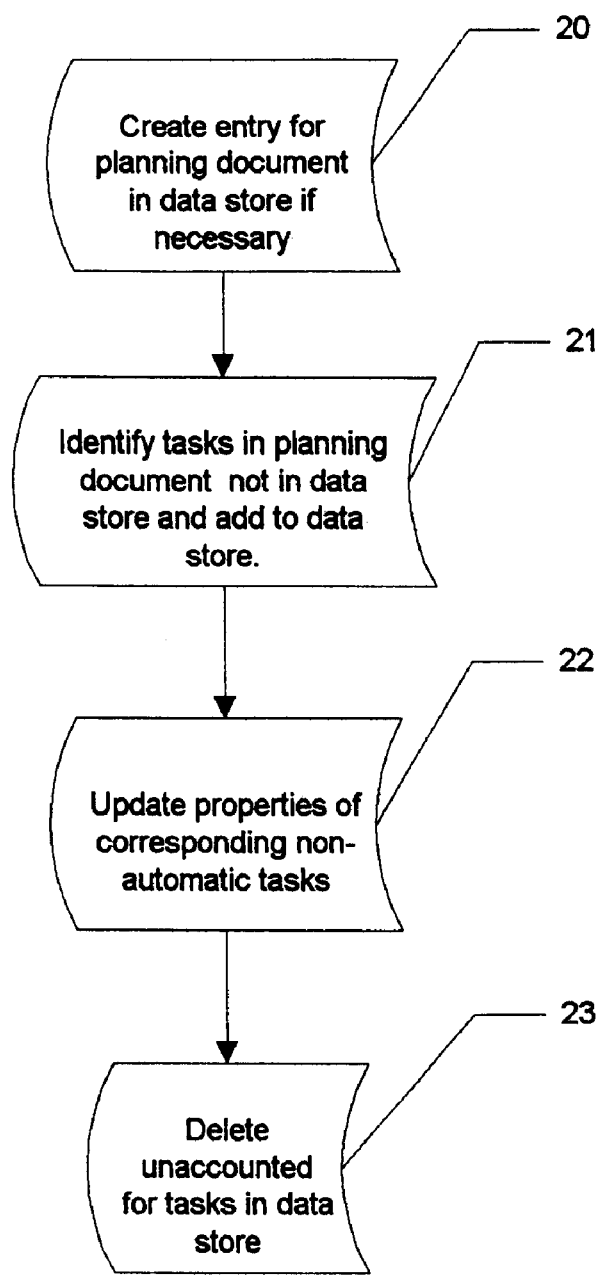
FIG. 3 shows a flow chart illustrating how the planning document is updated in the data store.

Expanding blocks 15 and 16, FIG. 3 shows how the planning document is updated in the data store. The first step is to create an entry if necessary 20. The exemplary embodiment uses the path of the Gantt chart as the key for the planning document. Microsoft Project, the planning document editor in the exemplary embodiment, assigns each task a uniqueID. The matching of two arbitrary trees is not well defined; so the invention uses the heuristic of matching lists of unique identifiers to determine which items have been added, deleted, or modified.

The exemplary embodiment iterates through the tasks in the planning document. For each task, it obtains the task's uniqueID and then searches the tasks that are stored in the data store. If the. task does not exist, it is added 21. If a task exists in the data store, its properties (including any name changes) are updated in the data store 22. Updating does not apply to automatic tasks—those maintained by the invention such as crash bugs. Automatic tasks are described in FIG. 6. If there are non-automatic tasks that have been deleted since the last edit, they are marked as deleted 23.

Figure 4:
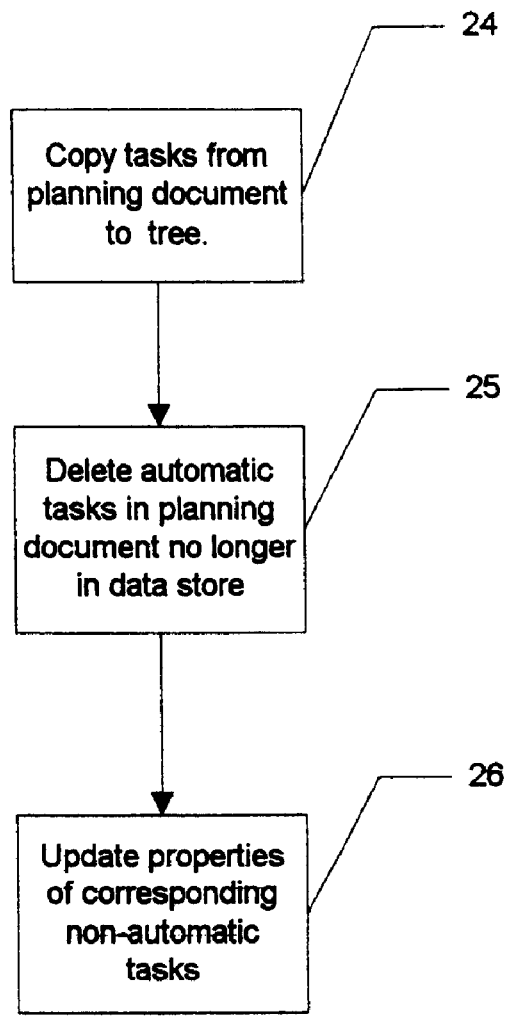
FIG. 4 shows a flow chart illustrating how the planning document tree is updated.

As shown in FIG. 4, the exemplary embodiment copies the structure of the planning document called the planning document tree 24. The embodiment then iterates through the automatic tasks in the planning task that are associated with the target code. If the task no longer exists (for example a procedure that the developer has deleted) on the data store side then the task is removed from the planning document 25. For tasks that were not removed, their properties are updated including adding, deleting, and modifying automatic sub tasks as necessary 26.

Returning to FIG. 2, during any time during Gantt chart editing, the manager can attach the target code by selecting a task in Microsoft Project where the code is to be attached- 17. The manager then selects the entire target code, or individual modules or procedures. Tests have individually selectable attachment points or all tests can be attached as a group. Bugs can be individually attached or as subsidiary tasks to modules or procedures.

Figure 5:
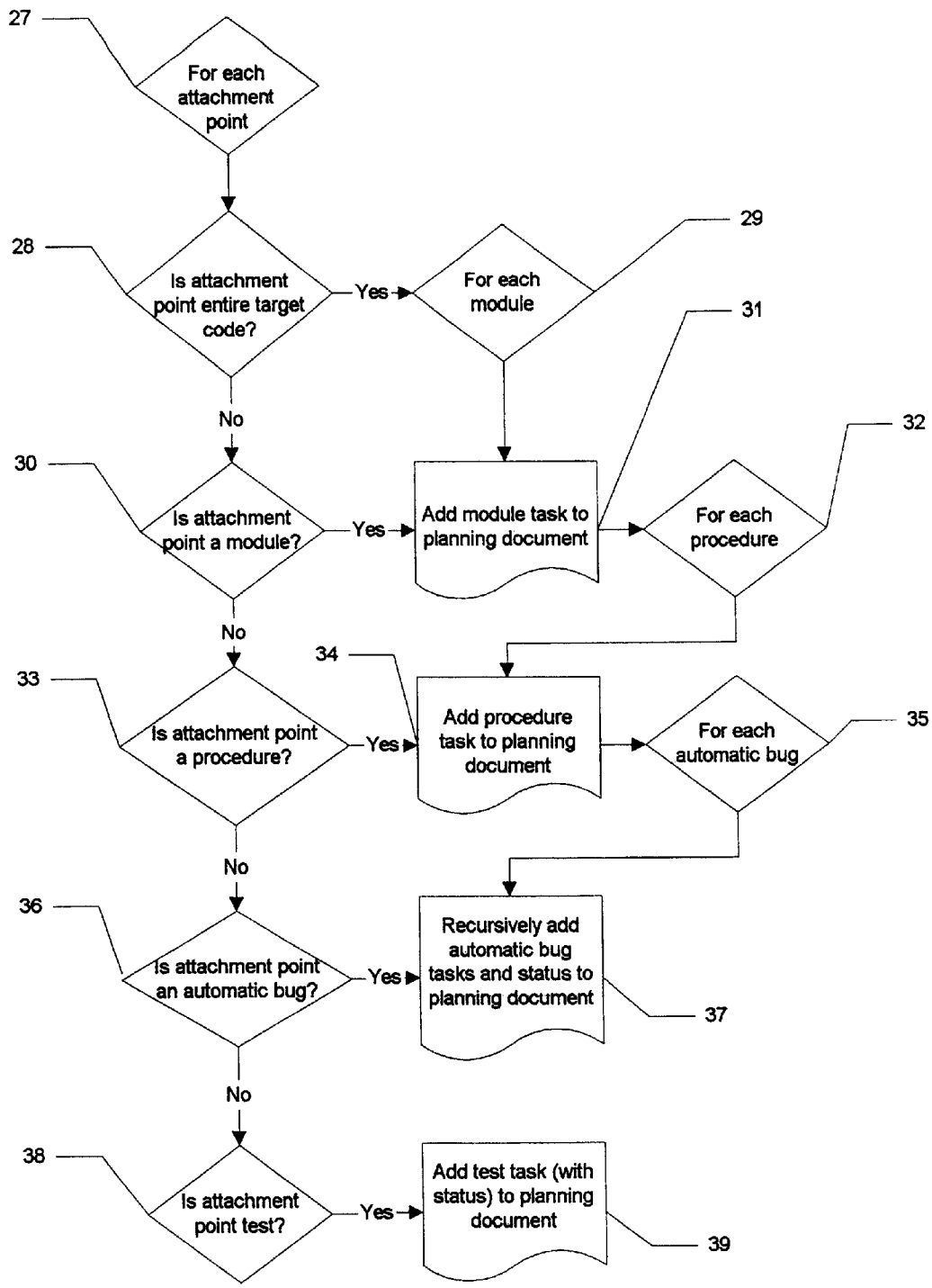
FIG. 5 shows a flow chart illustrating attachment of the target code.

The mechanism for attaching the target code referenced in Block 18 is detailed in FIG. 5. For each attachment point 27, the exemplary embodiment adds a task depending on the type of attachment point the manager has selected. If the attachment point is the entire code 28, then the invention iterates thrrough each module 29. Note the arrows (such as "next module") on all "for each" decision boxes in FIG. 5 have been omitted for clarity. For each module in the target code, a "module task" is created in the Gantt chart 31. Module tasks are also created if the manager has chosen to attach only a module, not the entire target code 30. Every module task iterates through its constituent procedures 32, creating procedure tasks on the planning document 34. Procedure tasks are also created if they are individually attached 33. All procedures iterate through automatic bugs, which occur in the procedure 35. Automatic bugs can recursively generate other automatic bugs as tasks in the document 37. The completion status of an automatic task in a planning document reflects the status. If the bug is fixed, the task is marked as 100% completed. As with modules and procedures, automatic bugs can be individually attached-to the Gantt chart 36. If the attachment point is a test 38, it is treated differently from the previously mentioned items, in that tests must be attached individually. Tests also have their-completion status set to the pass/fail status of the test 39.

The author of the target code (as determined by the ownership of the file containing each module of the target code) is also placed in the modified planning document. If the developer has not been associated with a "resource" (the name given to planning document for tasks' assignees), an association is created by the exemplary embodiment in the planning document editor. The ownership of automatic tasks in the planning task is assigned by the exemplary embodiment.

Figure 6:
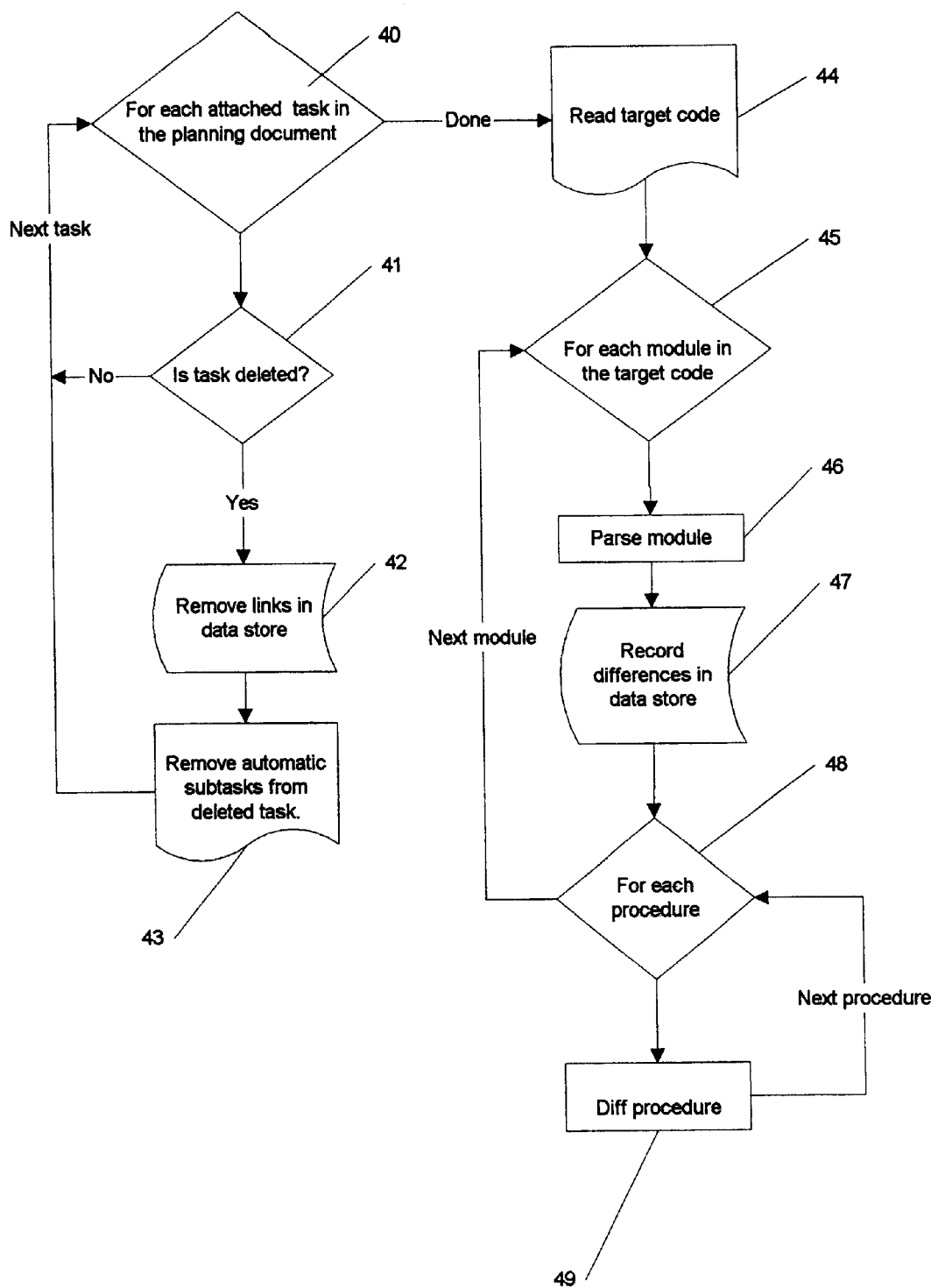
FIG. 6 shows a flow chart illustrating the generation of the modified planning document.

FIG. 6 details block 19 in FIG. 2, maintaining correspondence between the target code and the planning document. The first step in maintaining correspondence is to iterate through each point of attachment in the planning document 40. If the task is deleted 41, the link in the data store between the target code and planning document is deleted 42. In addition, the tasks generated by the invention which are descendents of the removed task are also removed from the planning document 43.

Figure 7:
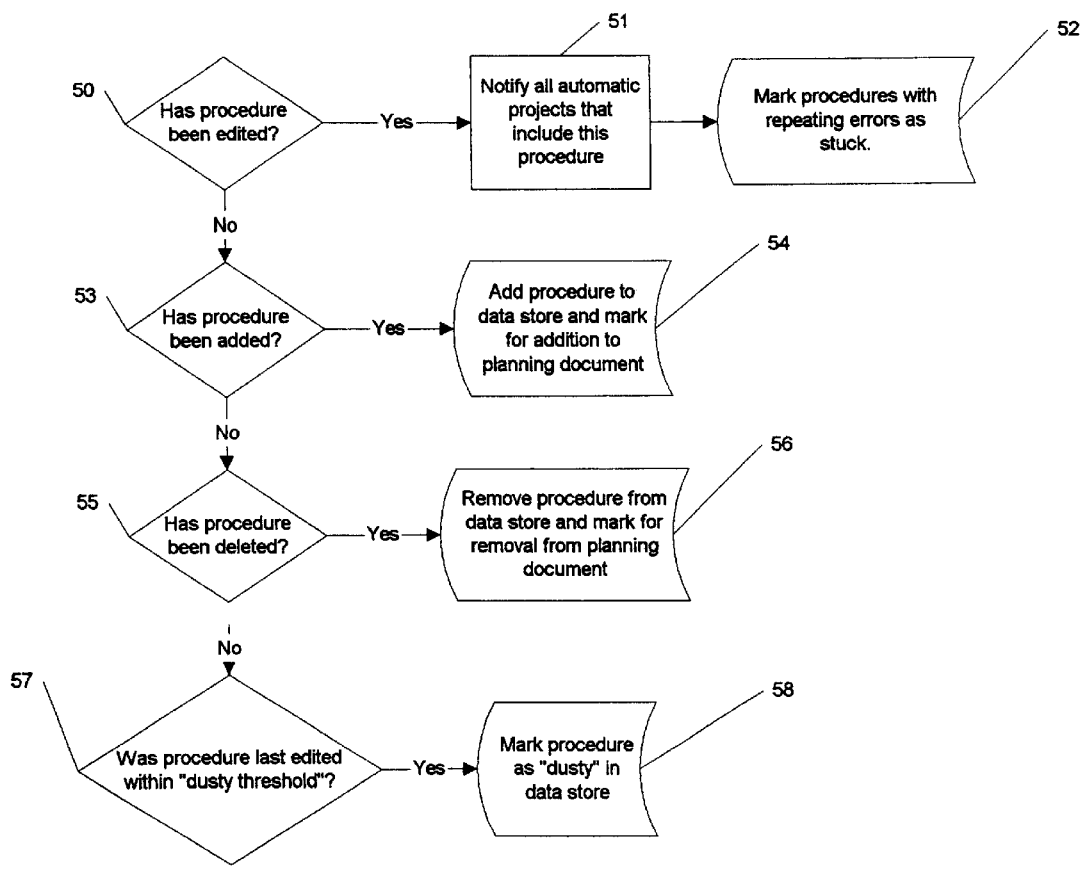
FIG. 7 shows a flow chart illustrating maintaining versions of target code.

After iterating through the tasks 40, the monitor process reads the target code 44. For each module in the target code 45, the module is parsed 46, and the differences are recorded in the data store 47. Then each procedure 48 is diffed 49 and the results are reflected in the data store as detailed in FIG. 7.

If a procedure has been edited 50, the exemplary embodiment notifies all automatic projects that include this procedure 51. Next, each procedure is checked to see if it is an area of code where the developer is stuck 52.

Figure 8:
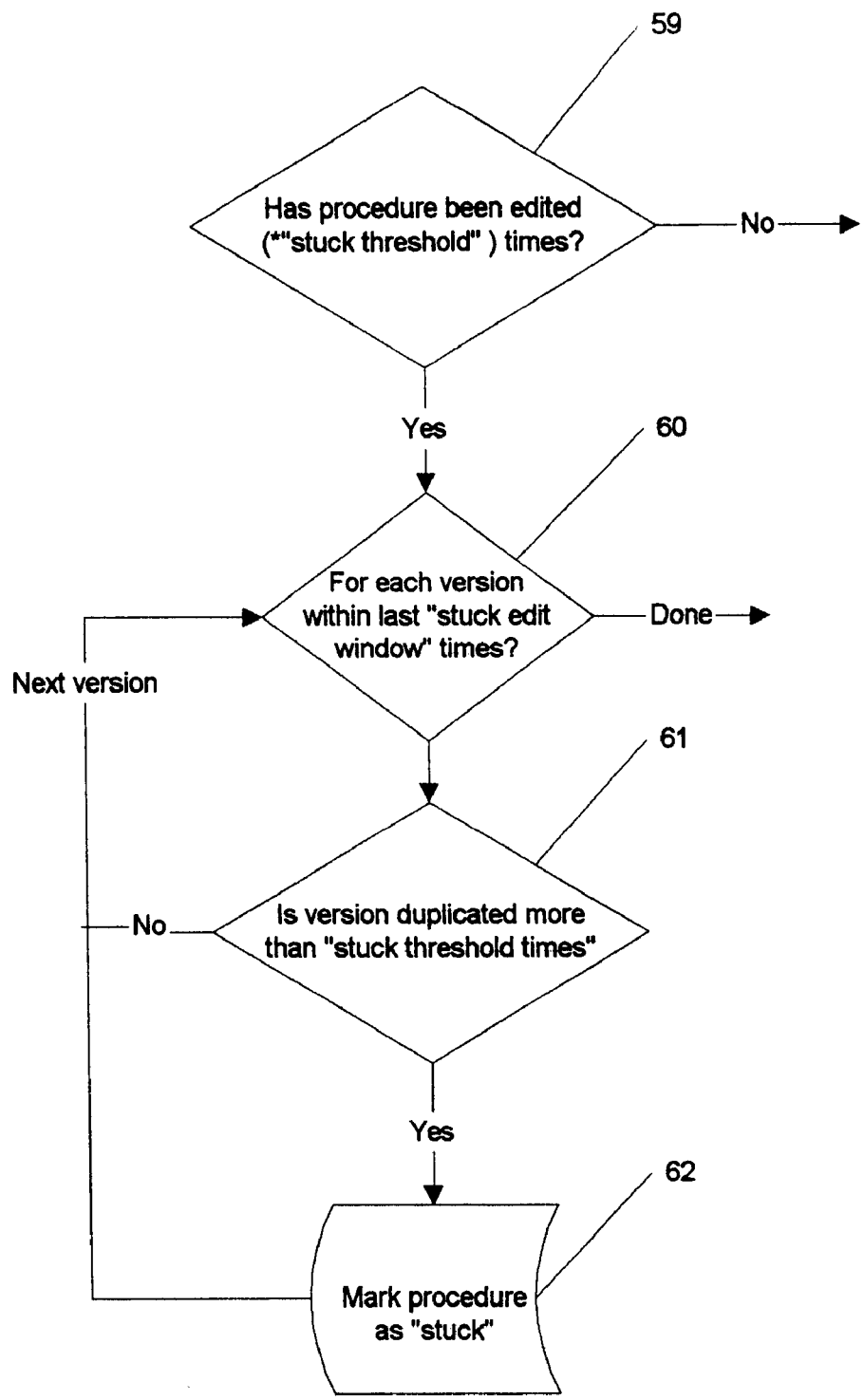
FIG. 8 shows a flow chart illustrating how versioning is used to identify areas of the target code where the developer may be stuck.

FIG. 8 shows how the invention decides if a developer is stuck. Two developer settable control the determination of a procedure's stuck status: the "stuck threshold" and the "stuck edit window". The stuck threshold is the number of times that a developer has to reinstate the code before it is stuck. The stuck edit window is the amount of calendar time the invention looks back to see if code is stuck.

If the procedure has been edited (2* "stuck threshold" −1) times 59, the exemplary embodiment iterates through each version that was edited within "stuck edit window" times 60? If the version is duplicated more than "stuck threshold times" 61, the procedure is marked as "stuck" in the data store 62.

Returning to FIG. 7, if the procedure has been added since the code was last versioned 53, the exemplary embodiment creates a task in the data store that will added to the planning document the next time it is updated 54. If the procedure has been deleted 55, the procedure is removed from the data store and marked for removal from planning document 56.

If the procedure last was not edited within "dusty threshold" 57, the procedure is marked as "dusty" in data store 58.

After all modifications to the data store have been made, the changes are reflected in the planning document updated in FIG. 2, block 19.

Automatic Bugs

Figure 9:
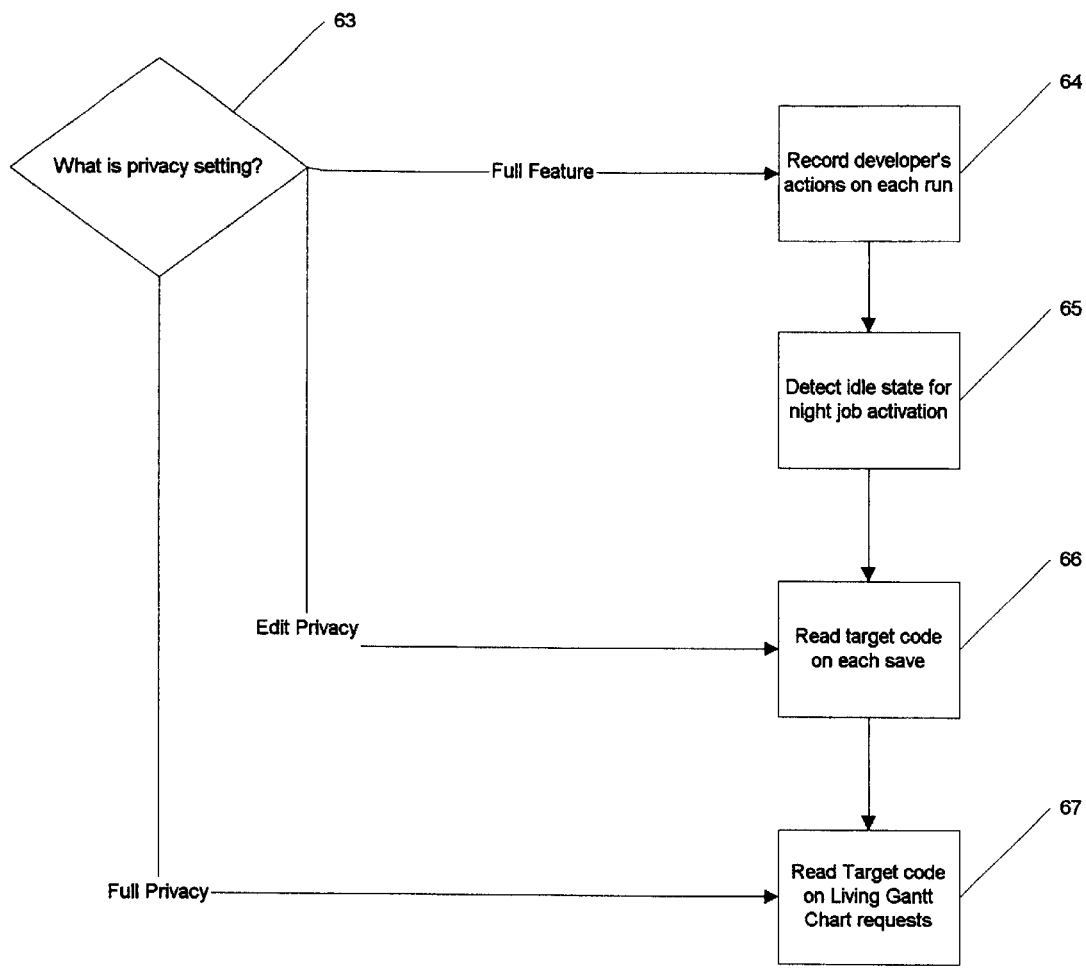
FIG. 9 shows a flow chart illustrating shows the monitor process.

A broad overview of the monitor process' execution is shown in FIG. 9. The monitor process performs the tasks referred to in blocks 64–67. Which tasks the monitor executes depends on the privacy level 63. The developer sets the privacy level. The exemplary embodiment supports three privacy levels:

1. Full Privacy
2. Edit Privacy
3. Full Feature

The more privacy the developer selects, the fewer features the exemplary embodiment is able to provide.

Regardless of the. privacy level, the exemplary embodiment (re) reads the target code into the data store when the planning document tree is being created 67. Note that the target code is not reread if it has not been changed since the last time it was saved.

If the developer has selected the Edit Privacy or Full Feature setting, the monitor process (re) reads the code each time the developer saves the code. Each time the code is saved, a new version is created 66.

If the developer has selected the Full Feature setting, the recording mechanism required by Implicit Ul is activated 64. The automated activation of Night Jobs (described below) requires the monitor process to detect when the system is idle 65.

Crash Bugs

Figure 10:
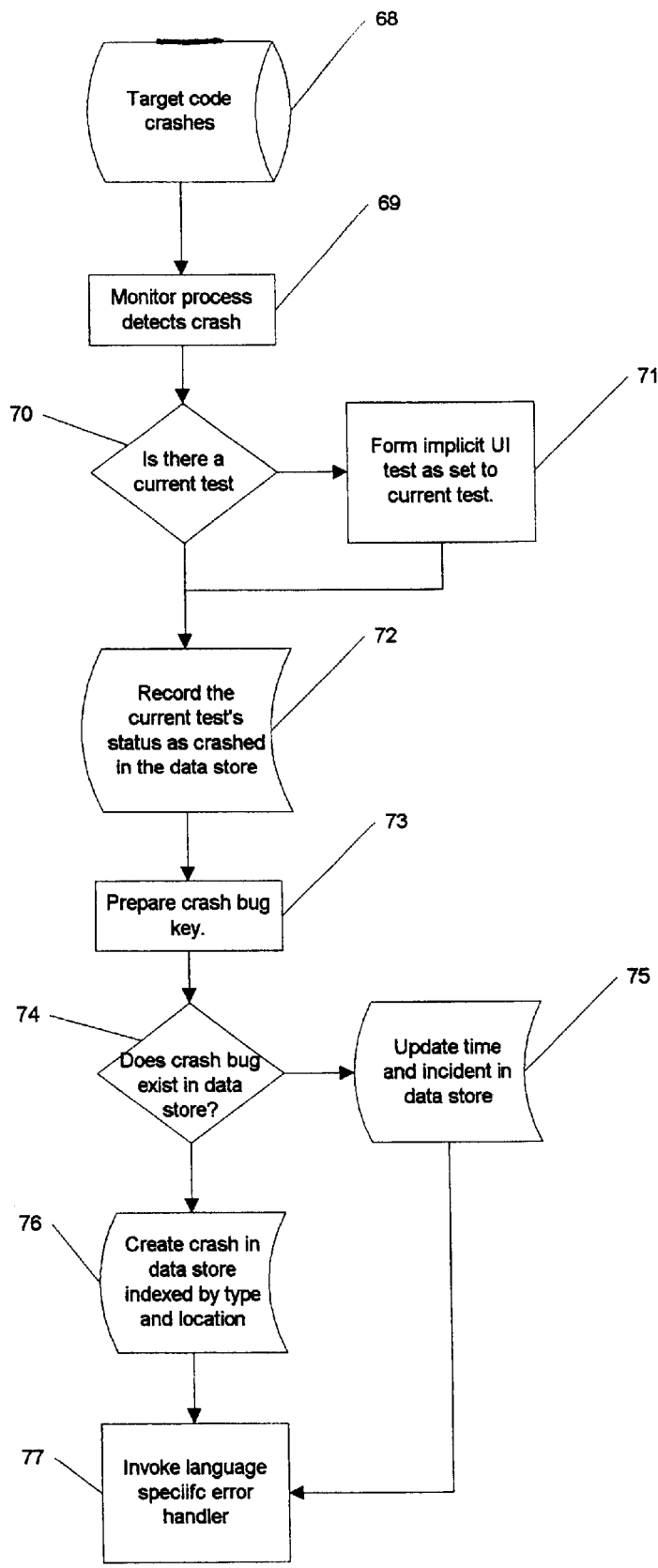
FIG. 10 shows a flow chart illustrating how crash bugs are created.

FIG. 10 shows how the exemplary embodiment creates crash bugs. When the exemplary embodiment's monitor process detects that the target code crashes 68, the monitor process detects it 69. The monitor determines the element (module, procedure, and statement) of the target code that the operating system's exception handler provides 69.

The monitor process determines if the target is currently running under a test that is known to exemplary embodiment (the current test) 70. If no current test is defined, the exemplary embodiment creates an implicit Ul test 71. The current test is marked as a crash test.

These combined error code; module, procedure, and statement provide a compound key into the data store for an object referred to as a "crash bug" 73. These circumstances are also recorded in an entity in the data store 75, 76.

The crash bug is actually created when a crash not previously recorded in the data store is encountered 74, 76. If a crash bug exists, the date of it last occurrence and its occurrence count are updated 75. Since a crash bug is an automatic task, it can be attached to a planning-document, where its status is maintained when the derived planning document is refreshed. A hypothesis about the crashes occurance, and options for the developer to respond to the crash, are generated by the language specific error handler 77.

Figure 11:
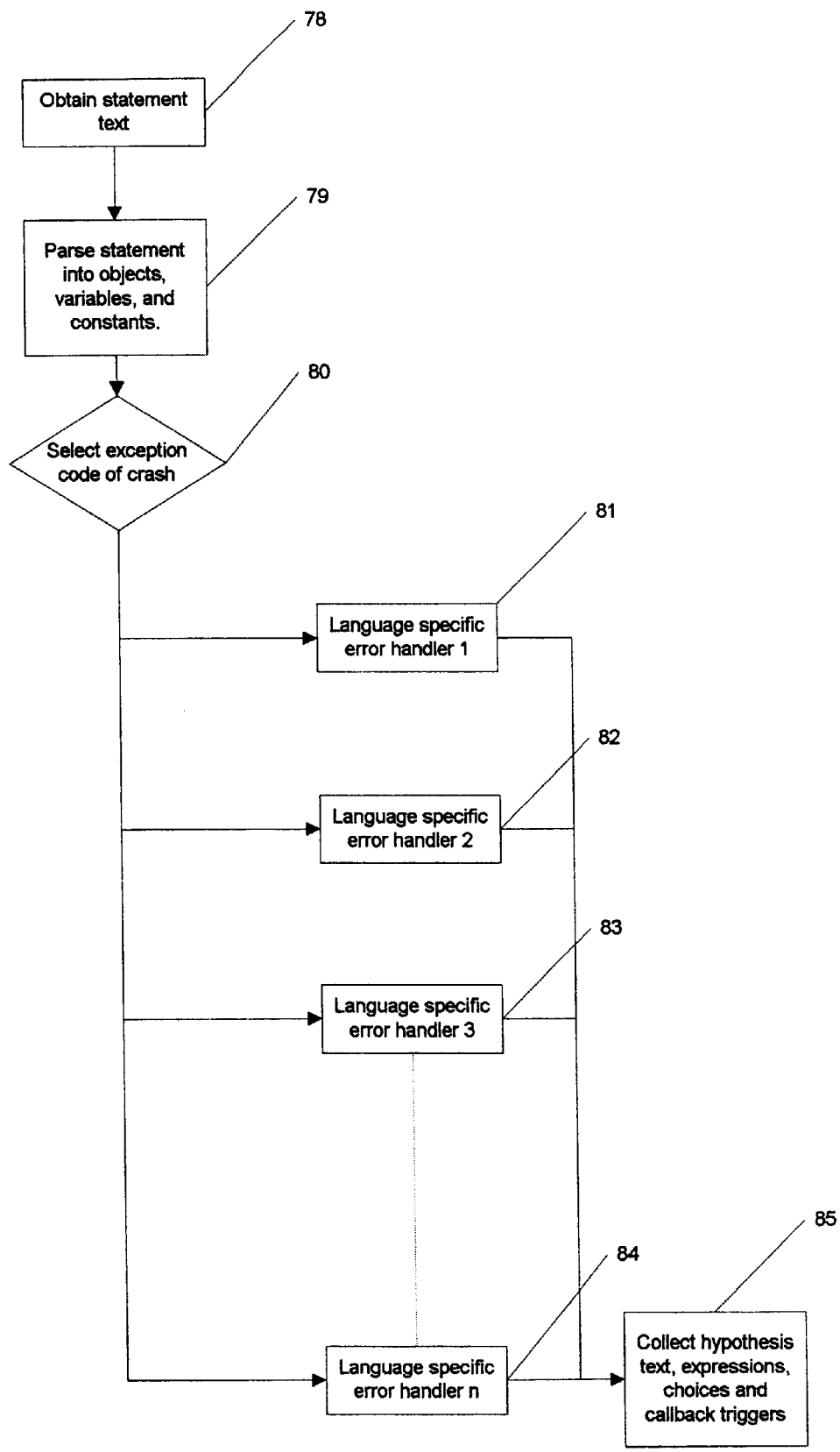
FIG. 11 shows a flow chart illustrating how language specific errors are invoked.

FIG. 11 shows how language specific errors are invoked set. Using the module, procedure, and statement information from the monitor, the exemplary embodiment recovers the statement where the code crashed 78. The exemplary embodiment parses the statement into expressions until there are only constants, scalar variables, source visible objects, and external data objects 79. Constants and scalar variables (that is variables containing only a single value) are used in their conventional sense. Source visible objects are objects which the exemplary embodiment has runtime access to source. All other objects are considered external data objects.

The exemplary embodiment then obtains an error code from the monitor and executes a method designed to handle that error 80. In general, there is one "language specific error handler" for each defined error 81–84. Each language specific error handler must provide 1. At least one hypothesis on why the error occurred
2. A set of options to present to the developer for what to do next including code suggestions
3. A set of triggers for dynamically extending hypotheses.

These items are generated by the language specific error for later display 85.

Figure 12:
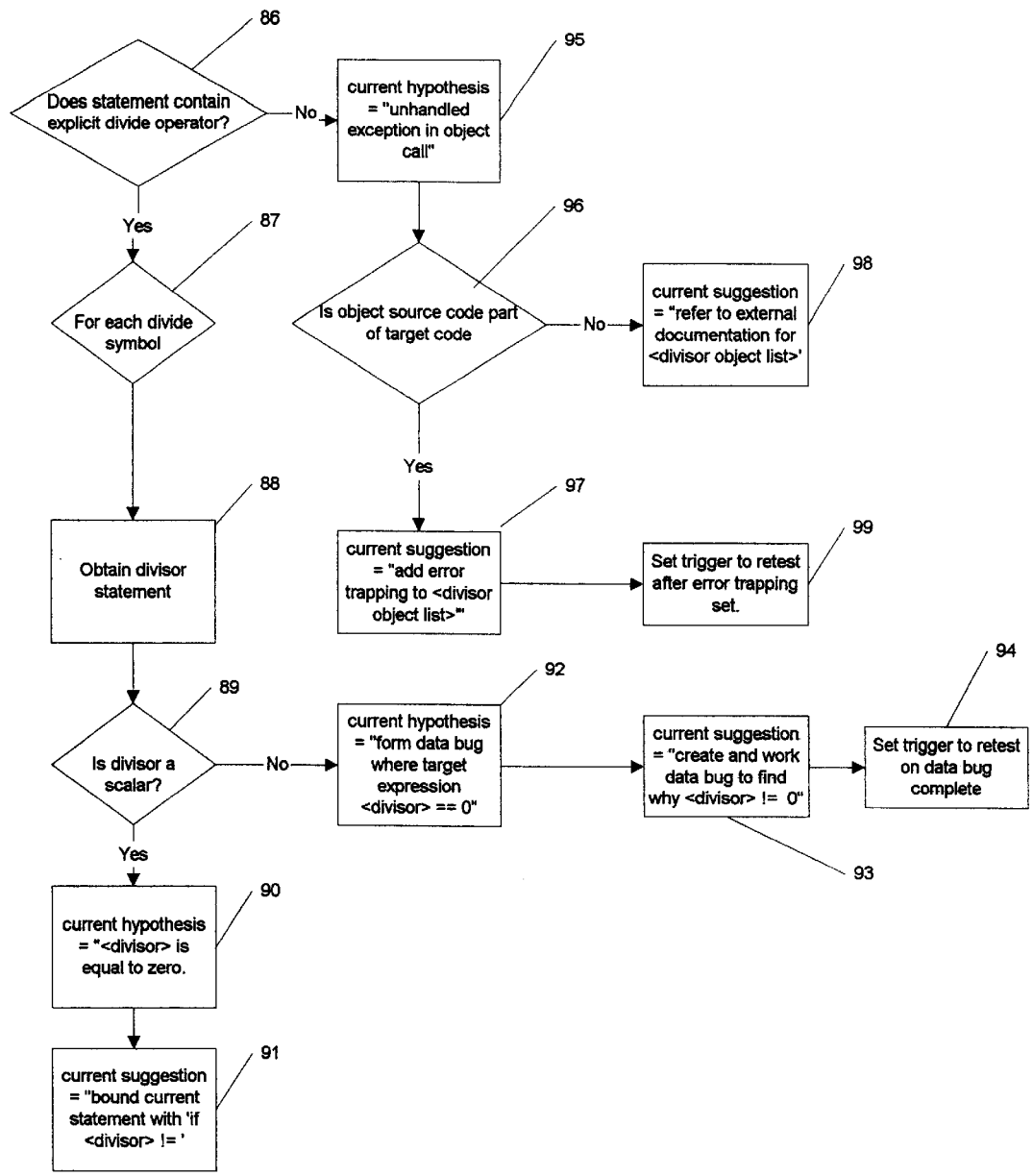
FIG. 12 shows a flow chart illustrating the language specific error handler for divide by zero.

Since there are over forty language specific error handlers in the exemplary embodiment, only one example will be discussed here, which illustrates the operation of all language specific error handlers without-loss of generality. FIG. 12 shows the language specific error handler for divide by zero. When the "divide by zero" error handler is invoked, the statement where the crash occurred is checked to see if it contains an explicit divide instruction 86. For each divide symbol in the statement 87, the exemplary embodiment obtains the divisor expression 88. If the divisor is a scalar (that is a simple variable or constant) 89, the error handler sets the "current hypothesis" to "divisor is zero." In this case, the current hypothesis is set to "<divisor> is equal to zero", where <divisor> is substituted by the variable or constant 90. The "current suggestion" is a proposed edit that surrounds the target statement with an "if" statement, which tests if the expression is zero 91. For example, the exemplary embodiment suggests that the statement $C=A/B$ be replaced by the statement
 If (B< >0) Then $C=A/B$ End If Therefore, the target statement will not crash if B is zero.

If the divisor is not a scalar 89, the exemplary embodiment does not attempt to resolve directly why the divisor is zero, but forms a data bug, which uses the divisor as the target expression 92. (See description of data bug below). The current suggestion is set to create and work data bug to find out why <divisor> not equal to zero" 93. The data bug sets a trigger to rerun the corresponding Implicit Ul test to determine if the divide by zero error is still present 94. Since any crash bug has a matching implicit Ul test, all crash bugs are potentially retestable.

A divide by zero may be generated if a procedure that's called contains a divide instruction. For example $A=SomeProcedure(B)$.

SomeProcedure may contain the instruction Z=X/Y which causes the exception. In this case, the exemplary embodiment sets the current hypothesis to "unhandled exception in object call" 95. If the object being called (e.g., SomeProcedure) is part of the target code 96, the current suggestion is set to "add error trapping to object" 97. A trigger is set to cause the exemplary embodiment to retest after error trapping is set 99.

If the object generating the divide by zero exception is not part of the target code, the current suggestion is set to "refer to external documentation for object" 98.

Figure 13:
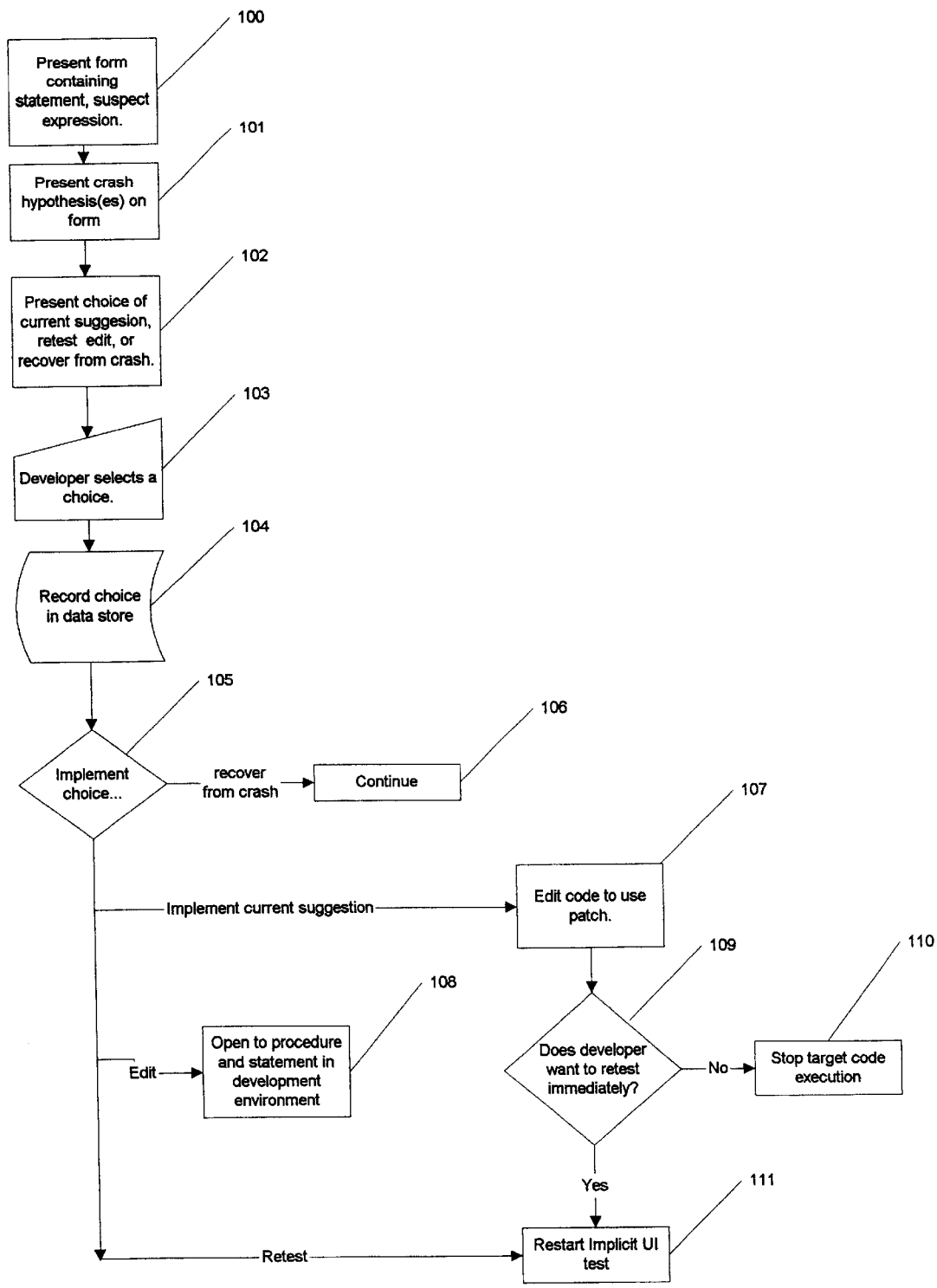
FIG. 13 shows a flow chart illustrating how the language specific error handler's results are presented.

FIG. 13 shows how the results of the language specific error handler are presented to and used by the developer. The exemplary embodiment displays the AutoDebug form showing the statement, exception, hypothesis, and current suggestion(s) 100. The form also displays the text of the current hypothesis 101. In addition to the current suggestion (s), the form always displays the choices of retesting, editing, or attempt to recover from crash 102. These options are always displayed so that the exemplary embodiment enhances, instead of restricting, the developer's workflow.

When the developer clicks on one of the choices 103, the invention invokes specific behaviors (106–109) but all choices are recorded in the data store 104. The developer's choices are therefore viewable to the manager in the Living Gantt interface. The manager can look at a log of all interactions on automatic bugs. The exemplary embodiment uses the selected option to implement the developers choice 105. The simplest option is to continue target code execution (if possible) 106. If the developer chooses to implement one of the exemplary embodiment's suggestions, the exemplary embodiment makes the appropriate changes to the target code 107. At this point, the developer is prompted whether the developer wants to retest immediately 109. If the answer is yes, the implicit Ul test is rerun 111. Otherwise, the target code is stopped 110.

If the developer wants simply to edit the code, the exemplary embodiment opens an editor window to the statement and procedure that caused the exception 108. The developer also has the option of simply rerunning the Implicit Ul test to see if the code crashes again 111.

Implicit Ul Test

Figure 14:
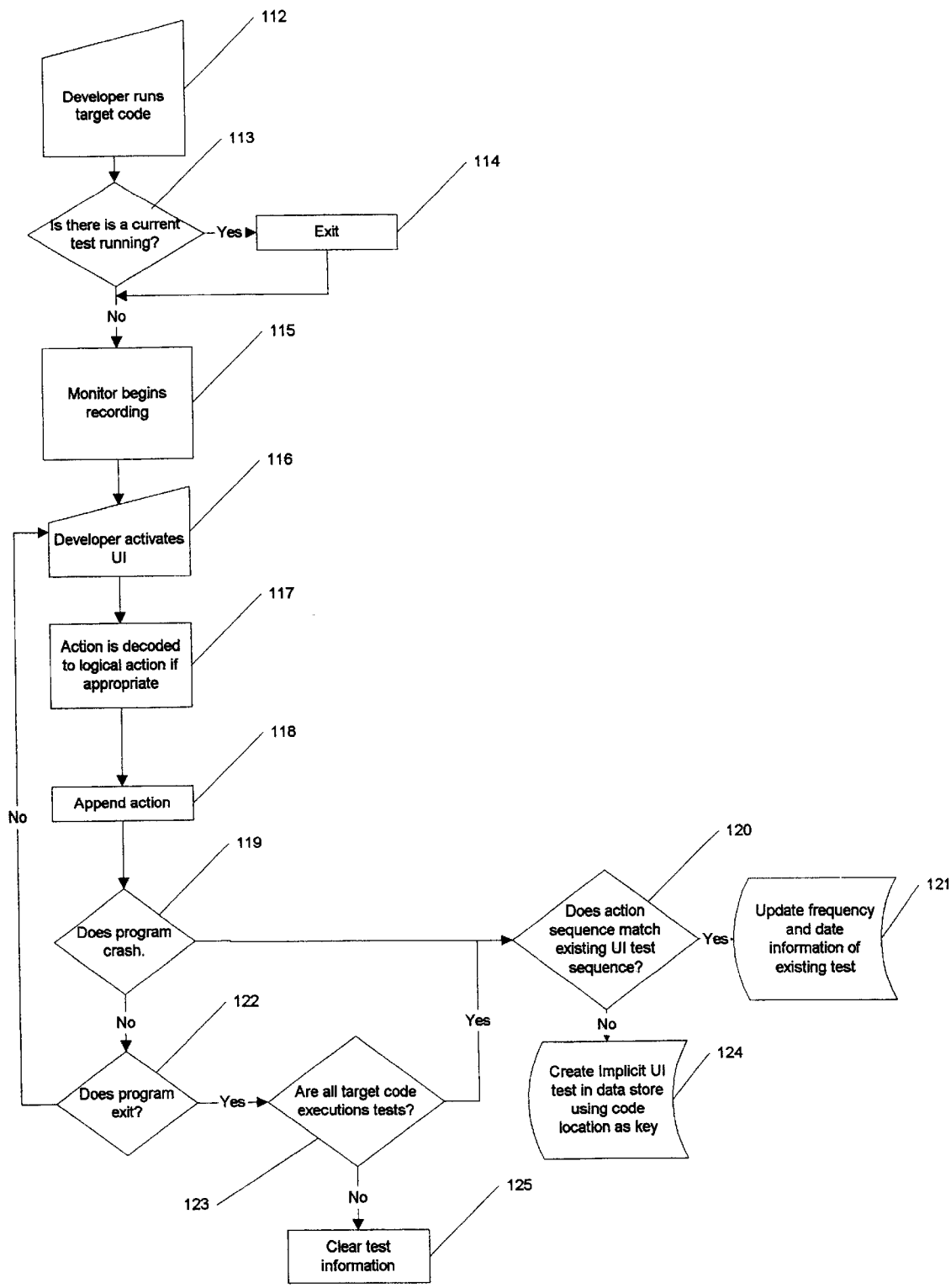
FIG. 14 shows a flow chart illustrating how an Implicit Ul Test is created.

FIG. 14 shows how an Implicit Ul Test is created. Implicit Ul Test creation may begin any time the target code is run 112. If the monitor process detects that a previously created test is running 113, no implicit test is created 114. Otherwise, the monitor process creates a new data structure for the test, but does not record this test-in data store; The test data structure includes an ordered list for storing the developer's actions 115.

Every time the developer uses the mouse or keyboard 116, the monitor process is notified of the event. The exemplary embodiment is built to use a window system. In a window system, the absolute placement of the windows is usually considered irrelevant, but the window's identifier is not. The window relative event is called a "logical event". The exemplary embodiment translates the event into a logical action 117 before appending the logical action 118 to the implicit Ul test. If the program neither crashes 119 nor exits 122, the steps described in blocks 116–118 are executed for every developer action.

If the program crashes 119, the test data sequence is matched against those tests existing in the data store 120. If no match is found, the exemplary embodiment creates a new test in the data store of type "Implicit UI" in the data store 124. If a match is found 120, the exemplary embodiment updates the existing Ul test in the data store by noting the details of the test 121 (including but not limited to user, date run, and number of times run).

If the program exits normally 122 and the exemplary embodiment is not set to record all target code executions as Implicit Ul tests 123, no test is recorded 125. If the developer has selected all invocations to be treated as tests, the test is recorded in the data store using the mechanism described above.

Loop Bug

Figure 15:
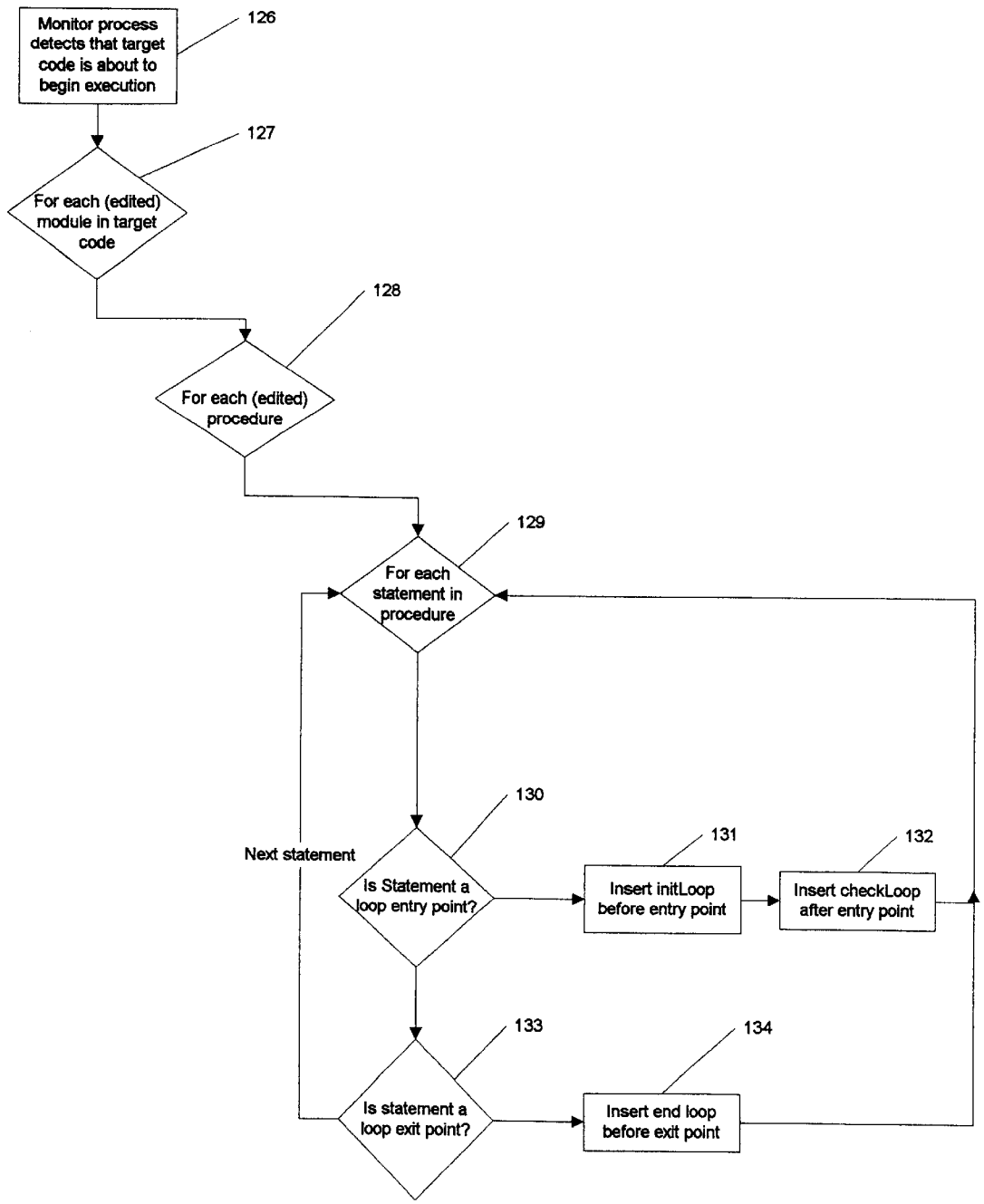
FIG. 15 shows a flow chart illustrating how the exemplary embodiment instruments the target code for loop bug detection.

FIG. 15 shows how the exemplary embodiment instruments the target code for loop bug detection. The monitor process detects that the target code-is about to begin execution 126. The monitor process then iterates through each module 127 and procedure 128. The word (edited) appears in the caption of items 127 and 128 because the developer can optionally choose to only instrument modules and procedures that are created or edited since the last code invocation. Since instrumenting incurs overhead and most loop bugs occur in newly edited code, this option permits the developer to focus the use of loop bug detection.

Figure 16:
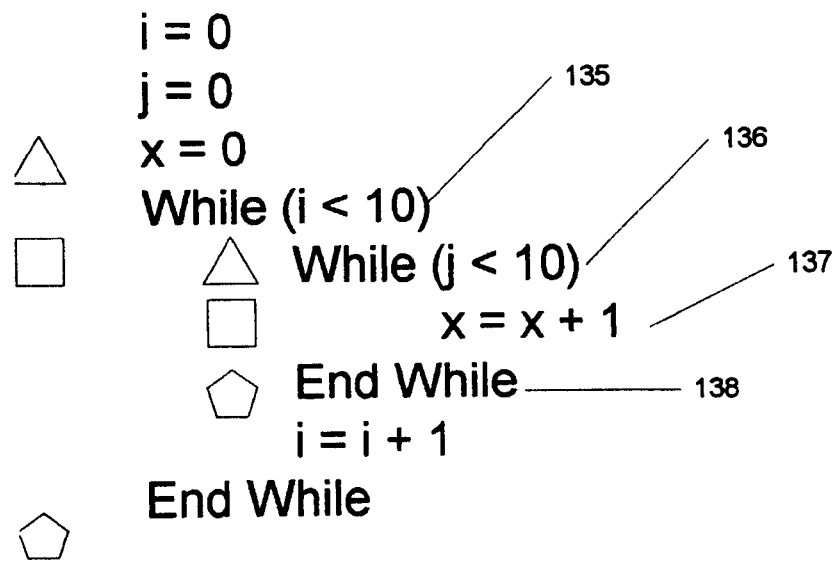
FIG. 16 shows a how a sample code fragment is instrumented for endless loop detection.
Figure 16:
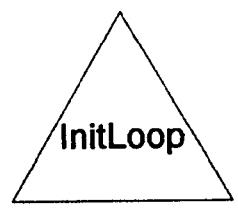
Figure 16:
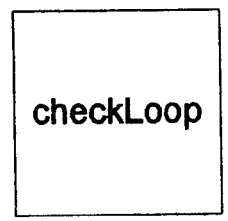
Figure 16:
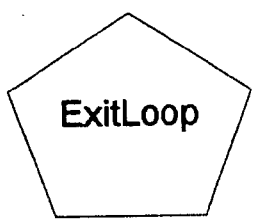

For each procedure under review, the exemplary embodiment parses each statement 129. The exemplary embodiment marks each "for", "do", or "while" statement as a "loop entry point" 130. The exemplary embodiment puts an init-Loop nerve before the loop entry point 131 and a checkLoop nerve after the loop entry point 132. Both initLoop and check loop take the procedure and statement number as parameters. The exemplary embodiment marks "exit" statements (the equivalent of "break" and "return" statements as "loop exit points." If a statement is a loop exit point 133, the exemplary embodiment inserts an exitLoop nerve before the loop exit point 134. FIG. 16 shows how a sample code fragment containing a nested loop is instrumented with loop nerves. The inner loop, block 136, is endless.

Figure 17:
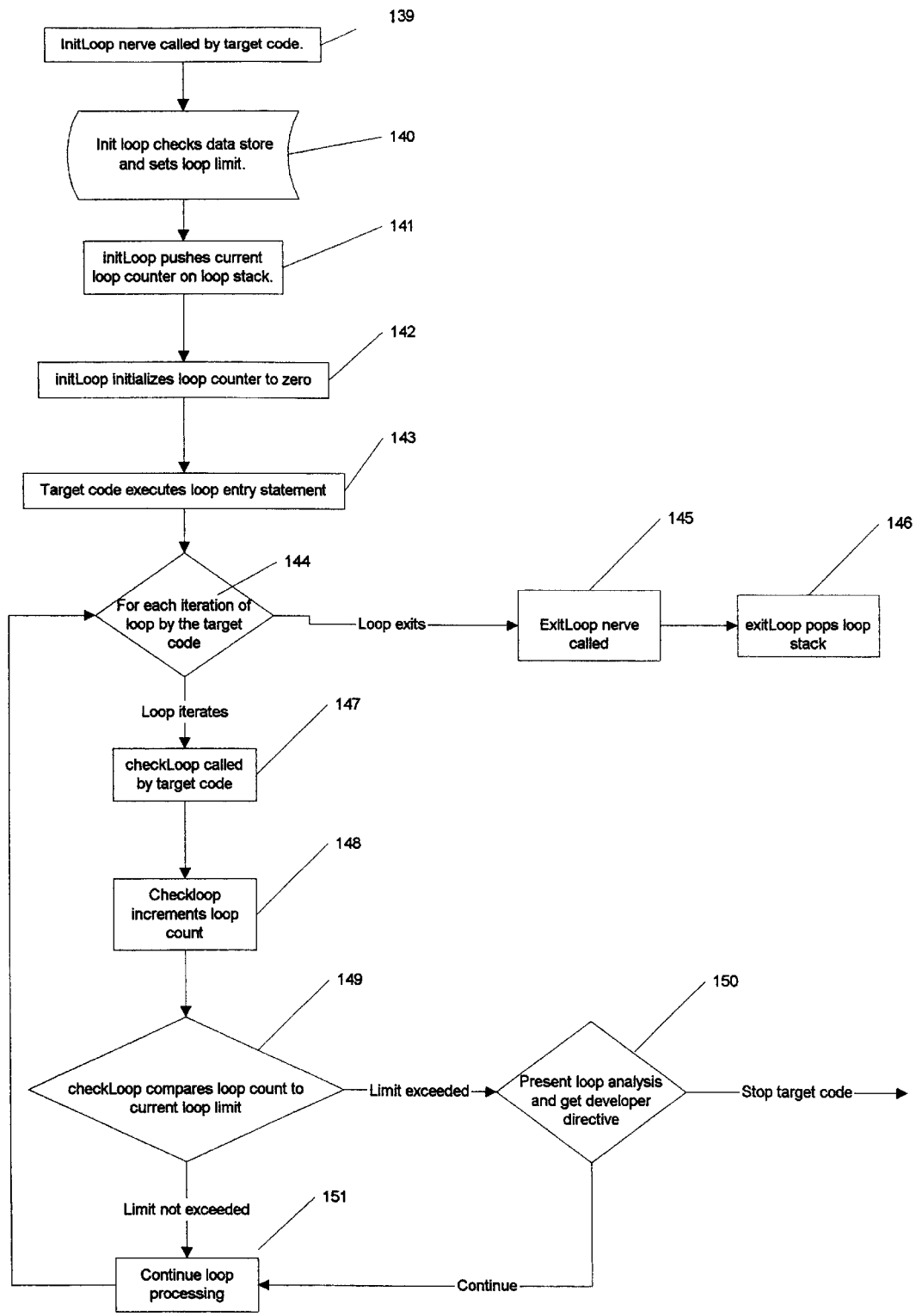
FIG. 17 shows a flow chart illustrating the process of detecting an endless loop at run time.

FIG. 17 details the process of detecting an endless loop at run-time. The loop-counter is the key to loop detection. Since loops are frequently nested, each active loop has its own counter. Referring to FIG. 16, the loop in block 135 must maintain different loop counter from the loop in block 136. Loop counters are stored on a "loop stack". If the loop counter exceeds the loop limit at run time the invention considers the loop potentially endless.

Returning to FIG. 17, blocks 139–149 illustrate the operation of loop nerves when the loop is not endless. Endless loop detection begins when the target code calls the initLoop nerve 139. The initLoop first sets the loop limit for that particular loop. The loop limit is set to a settable default unless there is an entry in the data store setting a non-default value for that loop 140. InitLoop pushes the current value of the loop counter on the loop stack 141. Init loop initializes the loop counter to zero 142. The initLoop nerve then exits and returns control to the target code, which then executes the first statement of the loop 143.

The target code then enters the loop 144. Within the loop, the first statement executed is a checkLoop nerve 147. CheckLoop increments the loop counter 148 and compares it to the current loop limit 149; If the loop count doesn't exceed the loop limit 149, then the loop's statements are executed normally 151. When the loop exits, the exitLoop nerve is called 145. ExitLoop pops the loop stack 146, ending loop monitoring. However, if the loop limit is exceeded 149 as would be the case with the code pointed to by block 136–138 (in FIG. 16), then the invention stops the target code execution and asks the developer for further instructions 150. Depending on the instruction, the target code either stops or resumes execution. The details of block 150 are shown in FIGS. 18 and 19.

Figure 18:
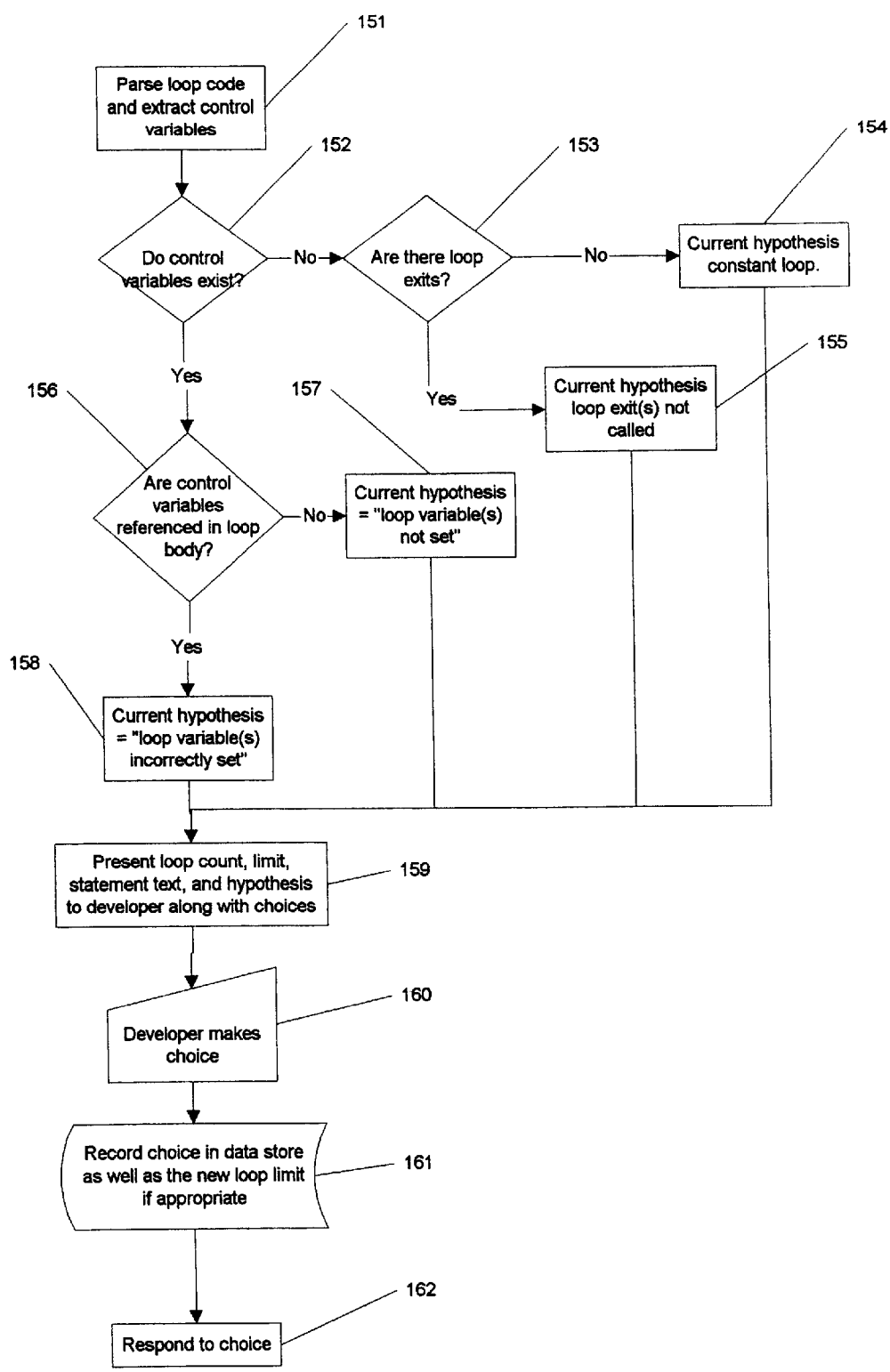
FIG. 18 shows a flow chart illustrating how the exemplary embodiment analyzes loops.
Figure 19:
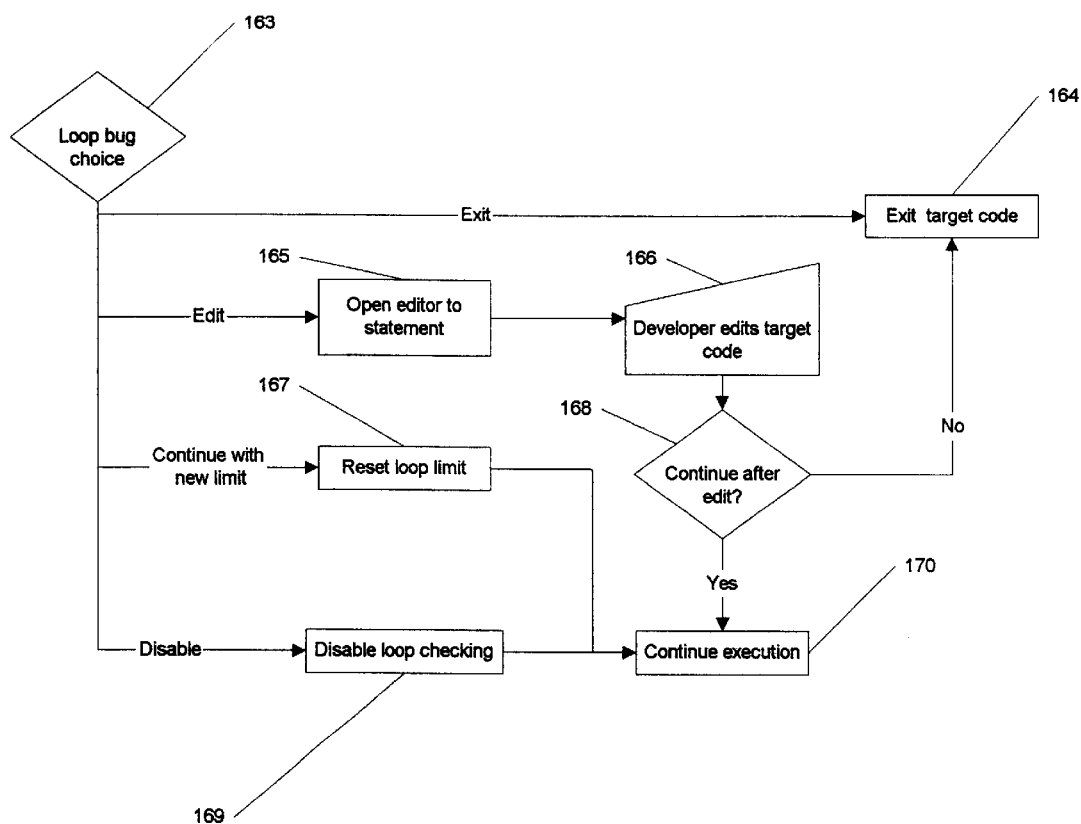
FIG. 19 shows a flow chart illustrating how the exemplary embodiment responds to developer's loop bug choices.

FIG. 18 shows how the exemplary embodiment analyzes loops. First, it parses the loop control statement (e.g., the for statement) and extracts the control variables 151. Control variables are variables that determine when a loop terminates. Referring to FIG. 16, "I" and "J" are the control variables of loops 135 and 136 respectively.

Steps 152–158 form a hypothesis is about why the loop appears endless. If no control variable(s) exist 152, then the exemplary embodiment determines if the loop body contains statements that explicitly exit the loop (go to, return, exit, break, etc.) 153. If no loop exits are in loop body, the current hypothesis set to "loop is intentionally endless", since a loop without control variables or exits will never terminate 154. If loop exits are present, the current hypothesis is set to "loop exit(s) not called" 155.

If controls variables exist 152, the exemplary embodiment sees if they are ever changed in the loop body 156. If the control variable(s) aren't set (as is the case in FIG. 16, blocks 136–138) the current hypothesis is set to "loop variable(s) not set" 157. If control variables are set, the current hypothesis is "loop variable(s) incorrectly set" 158.

Once the exemplary embodiment sets the current hypothesis, it presents its hypothesis as well as the loop count, limit, statement text, and hypothesis to developer 159, who then chooses what to do next 160. The developer can choose to 1. Stop the execution target code
2. Edit target code and retest
3. Set new value for loop limit and continue execution
4. Disable loop checking for this loop The developer's choice is recorded in the data store 161 as well as the new loop limit if appropriate.

Next, the exemplary embodiment responds to the developer's choice 162, which is shown in FIG. 19.

If the developer chooses to edit the coder 163, the exemplary embodiment opens the editor up to the statement 165 and asks if the developer wants to continue target code execution 168 after the edit completes 166 and acts accordingly (164–170). In the case of resetting the loop limit 167, or disabling loop checking 169, the target code continues execution 170. Otherwise, the monitor stops execution of the target code 164.

Control Flow Bug

Figure 20:
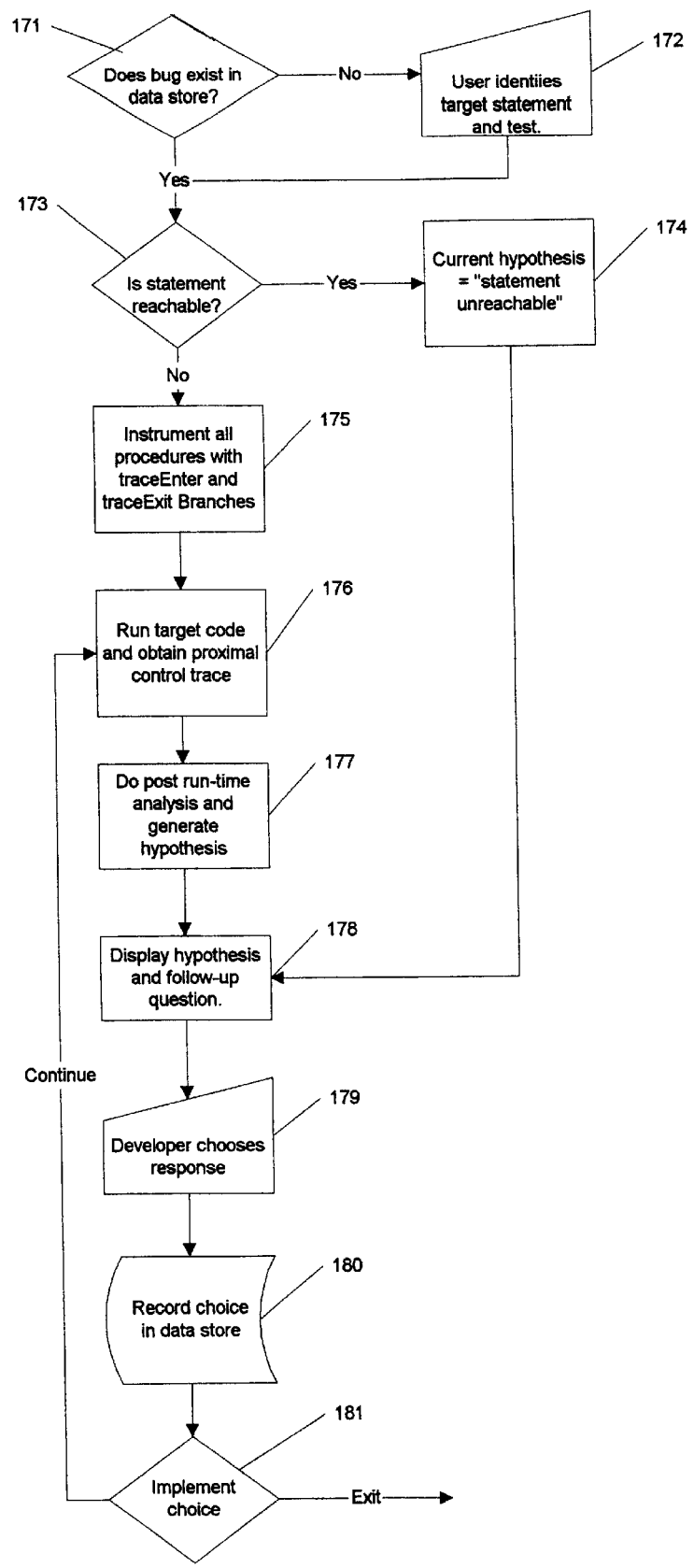
FIG. 20 shows a flow chart illustrating how a control flow bug is created.

Control flow bugs automate the finding of why a target statement is not called when the developer expects that it should. FIG. 20 shows how a control flow bug is created. If the control flow bug does not already exist in the data store 171, the developer clicks on a target statement in the development environment and selects a test to use 172. If no test is selected, the developer simply executes the target code, and the exemplary embodiment creates an Implicit UI Test. The exemplary embodiment defines the bug by the target statement and test.

Before proceeding to solve the control flow bug, the exemplary embodiment checks if the target is syntactically reachable (can be executed at all) 173. For example in this code fragment, the statement X=X+1 is not reachable If (False)

$X=X+1$

End If

If the statement is unreachable, the current hypothesis is set to "statement unreachable", the hypothesis is shown and the developer is prompted for a response 174.

In the usual case where the statement is reachable 173, the exemplary embodiment then adds traceEnter and traceExit nerves for each procedure in the target code 175. TraceEnter nerves are placed at the procedure entry point and detect when a procedure has been called. TraceExit nerves are place at all procedure exit ("return") statements and detect when a procedure exits. In addition, the exemplary embodiment instruments all branches (e.g., if, switch, select statements, as well as loops). Branches are instrumented with the traceBranch nerves TraceBranch nerves detect which branch (for example the "else branch") is taken on a branch statement. Since all loops are implicitly branches (a loop may or may not be entered), all loops are instrumented as described above. In this case, the checkLoop nerve serves the same function as the traceBranch nerve.

Once the target code is instrumented, the target code is run by the exemplary embodiment and the proximal control trace is obtained 176. The proximal control trace is a selected history of target code execution, highlighting those sections of execution that almost called the target statement.

Figure 21:
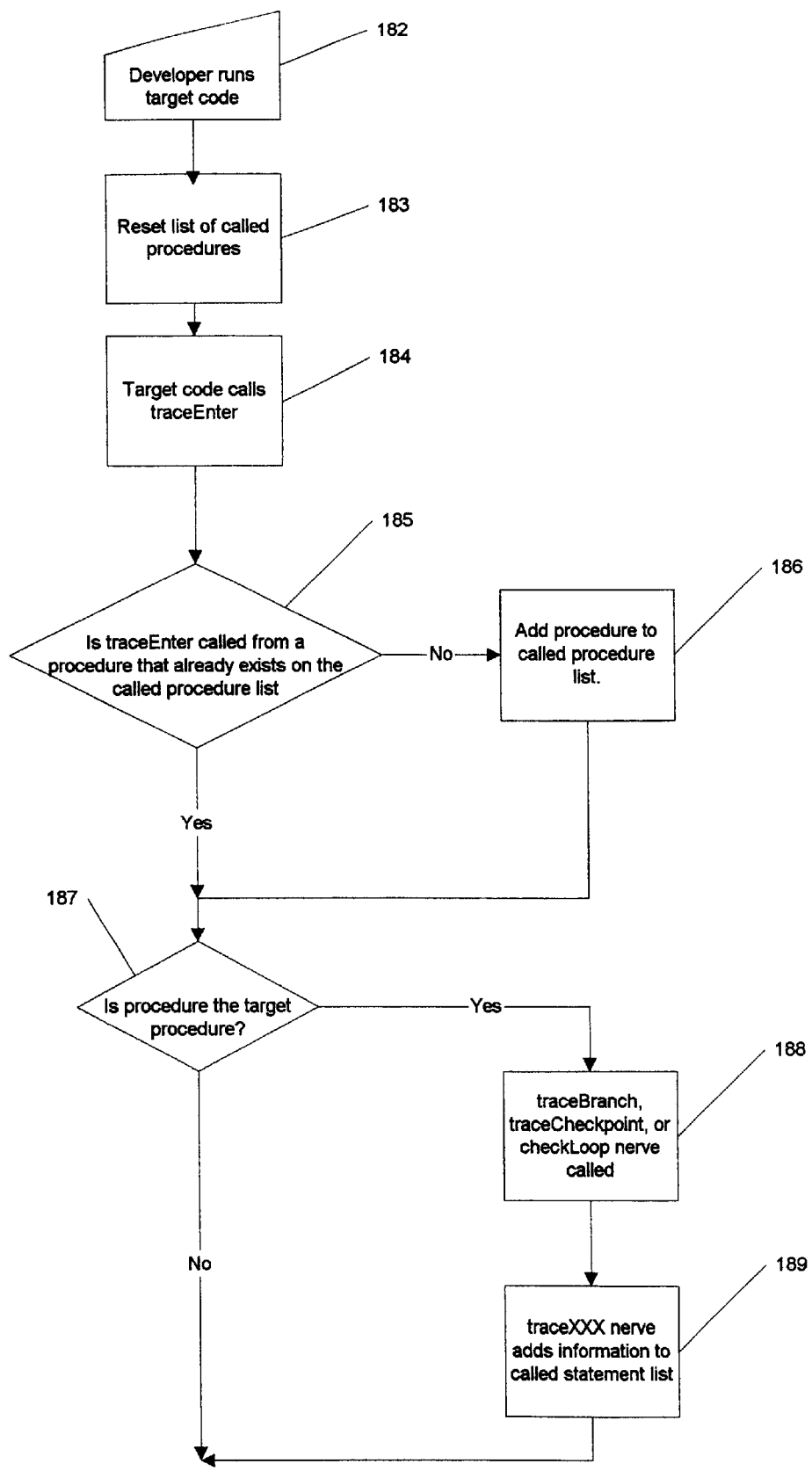
FIG. 21 shows a flow chart illustrating how the proximal control trace is updated at run-time.

FIG. 21 details how the proximal control trace is created at run-time. When the developer runs the target code 182, the exemplary embodiment resets the list of called procedures 183. Each time an instrumented procedure is entered at run-time, traceEnter is called 184. TraceEnter takes the procedure identifier as its argument. TraceEnter uses the procedure identifier to add the procedure to the list of called procedures if necessary (185, 186). If the target execution is within the scope of the target procedure 187, traceXXX nerves (traceBranch, traceCheckpoint, or checkLoop nerves) are called 188. These nerves monitor the target code's run-time behavior by updating the called statement list 189.

Returning to FIG. 20, the next step in fixing a control flow bug is analyzing the proximal control trace to form a hypothesis as to why the target statement was not called 177.

Figure 22:
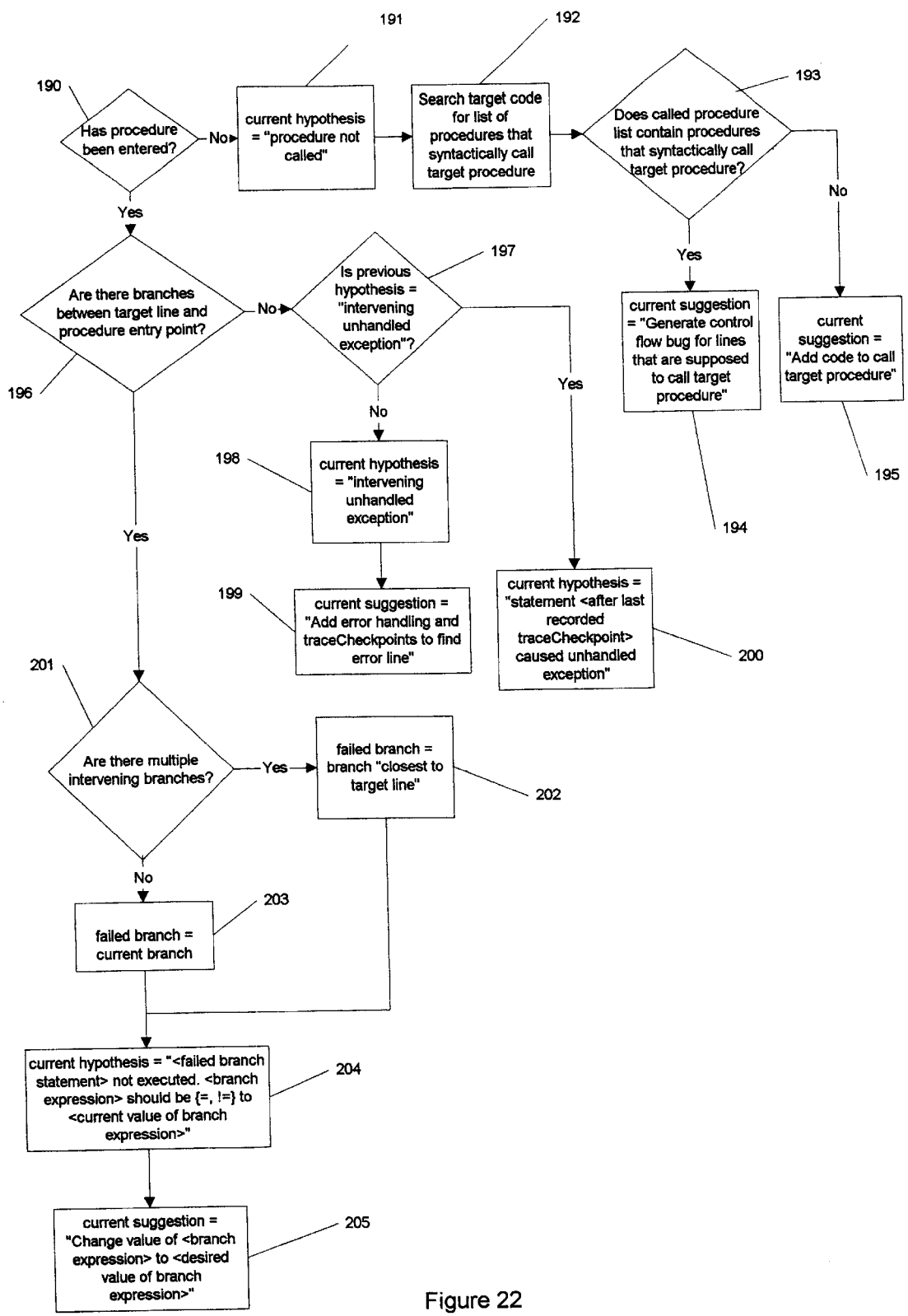
FIG. 22 shows a flow chart illustrating the post run-time analysis of a control flow bug.

FIG. 22 shows the post run-time analysis of a control flow bug. The goal of the runtime analysis is to set the values of two variables "current hypothesis" and "current suggestion", which will later be displayed to the developer and determine the post run-time behavior of the exemplary embodiment.

By searching the called procedure list, the exemplary embodiment determines if the target procedure has even been called 190. If the procedure was never called 190, then the current hypothesis is set to "target procedure not called" 191. The exemplary embodiment then prepares and searches a list of procedures that call the target procedure 192. If the target procedure caller list is not empty. 193, the current suggestion is set to "Generate control flow bug for statements that are supposed to call target procedure" 194. If there are no candidate callers 193, then the current suggestion is set to "Add code to call target procedure" 195.

If the procedure has been called, the exemplary embodiment determines if there are any branch statements between the target statement and the procedure entry point 196. If no intervening branches exist, the target statement may not have been executed because the target code threw an unhandled (untrapped) exception between the procedure entry and the target statement. Automatic bugs recall their previous hypothesis from the data store. If the previous hypothesis is that there was an unhandled exception 197, the current hypothesis is set to "statement <after last recorded traceCheckpoint> caused unhandled exception" 200.

If the previous hypothesis was not set to "intervening" unhandled exception 197, the exemplary embodiment sets it 198 and the current suggestion is set to "Add error handling and traceCheckpoints to find error statement" 199.

If there are intervening branches in the proximal control trace, the exemplary embodiment determines if more than one branch exists 201. If there is more than one branch, the exemplary embodiment finds the branch that is "closest" (fewest number of instructions away) from the target statement 202. The exemplary embodiment hypothesizes that this is the "failed branch." If there is only one branch, the exemplary embodiment hypothesizes that this is the failed branch 203.

In this step, the exemplary embodiment forms the hypothesis "<failed branch statement> not executed. <branch expression> should be {=, !=} to <current value of branch expression>" 204. The phrase in braces ({ }) means that either equal or not equal will be used as appropriate. The current suggestion="Change value of <branch expression> to <desired value of branch expression>" 205.

Returning to FIG. 20, the exemplary embodiment displays the hypothesis and suggestions for fixing the bug 178. The developer chooses from a choice of 1. Stopping execution
2. Create and work data bug
3. Find why procedure wasn3t called
4. Implement suggestion
5. Edit and test The developer's response 179 is recorded in the data store 180; The exemplary embodiment then takes the appropriate action 181. The exemplary embodiment's reacts to the developer response shown in FIG. 23. The exemplary embodiment can either continue to rerun the target code 176 or exit.

Figure 23:
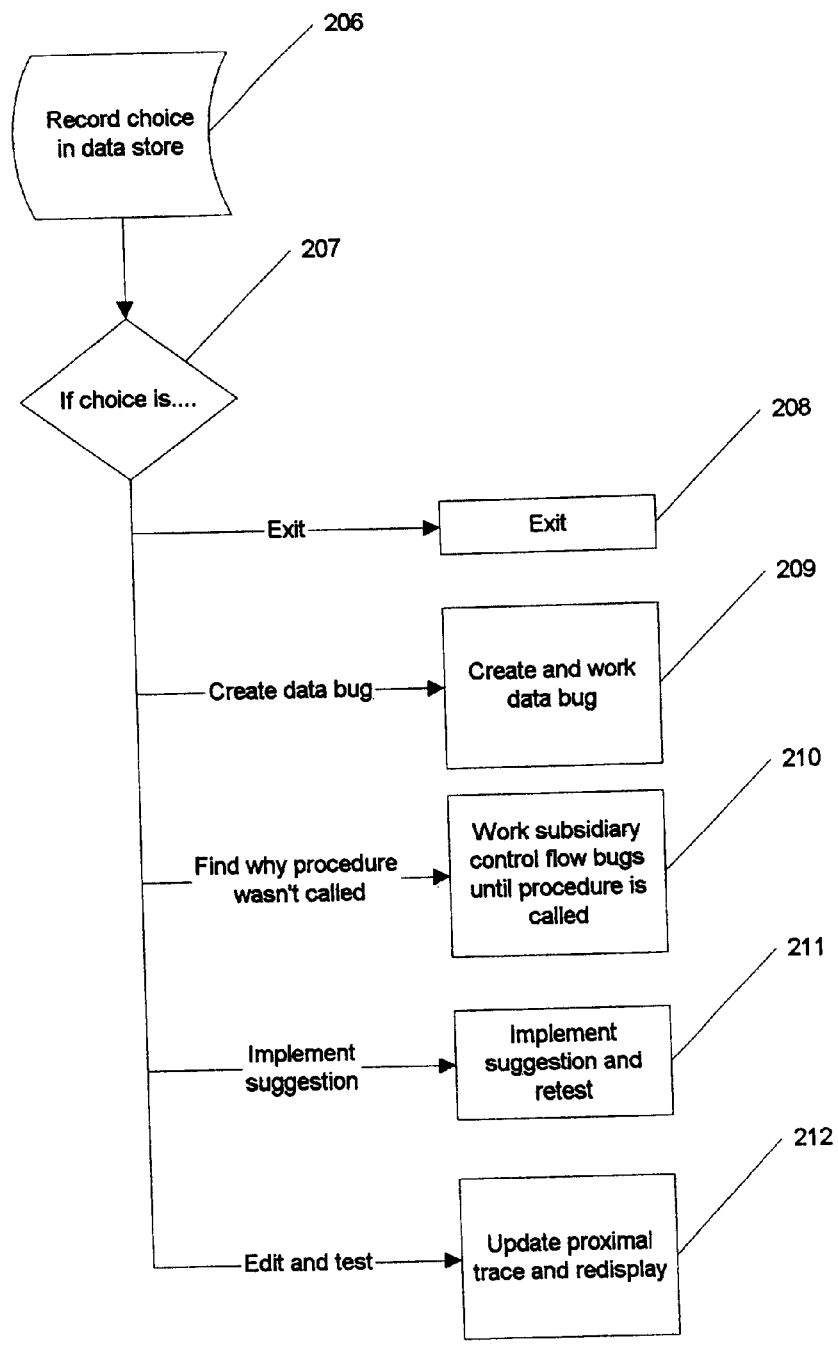
FIG. 23 shows a flow chart illustrating how the exemplary embodiment responds to the developer's choice.

FIG. 23 shows how the exemplary embodiment responds to the developer's choice. After storing the choice in the data store 206, the exemplary embodiment selects from one of these five behaviors:

1. Exit 208. The bug is saved for later reworking.
2. Creates a data bug 209. A data bug is an automatic bug for finding out why a value is set incorrectly. The exemplary embodiment's implementation of data bugs is described below. The newly created data bug is a subsidiary bug of the find why not called bug that created it. When the subsidiary data bug is complete, the exemplary embodiment returns to the find why not called bug and retests 176 (FIG. 20).
3. Find why procedure was not called 210. This option is only displayed if the procedure was not entered. In this case, the exemplary embodiment searches the called procedure list for procedures which themselves syntactically could call the procedure. The exemplary embodiment displays this list to the developer who creates and works a "find why not called" bug for each of the potentially calling procedures 176 (FIG. 20). These subsidiary bugs are worked until the procedure is called.
4. Implement suggestion 211. As with crash bugs, the exemplary embodiment rewrites the code and retests.
5. Edit and test 212. Here the developer makes free form edits and when done, notifies the exemplary embodiment. The exemplary embodiment reruns the test. After the test is run, the bug is either marked as fixed or a new proximal control trace is generated 212 and the process resumes at block 176 (FIG. 20).

Data Bug

Figure 24:
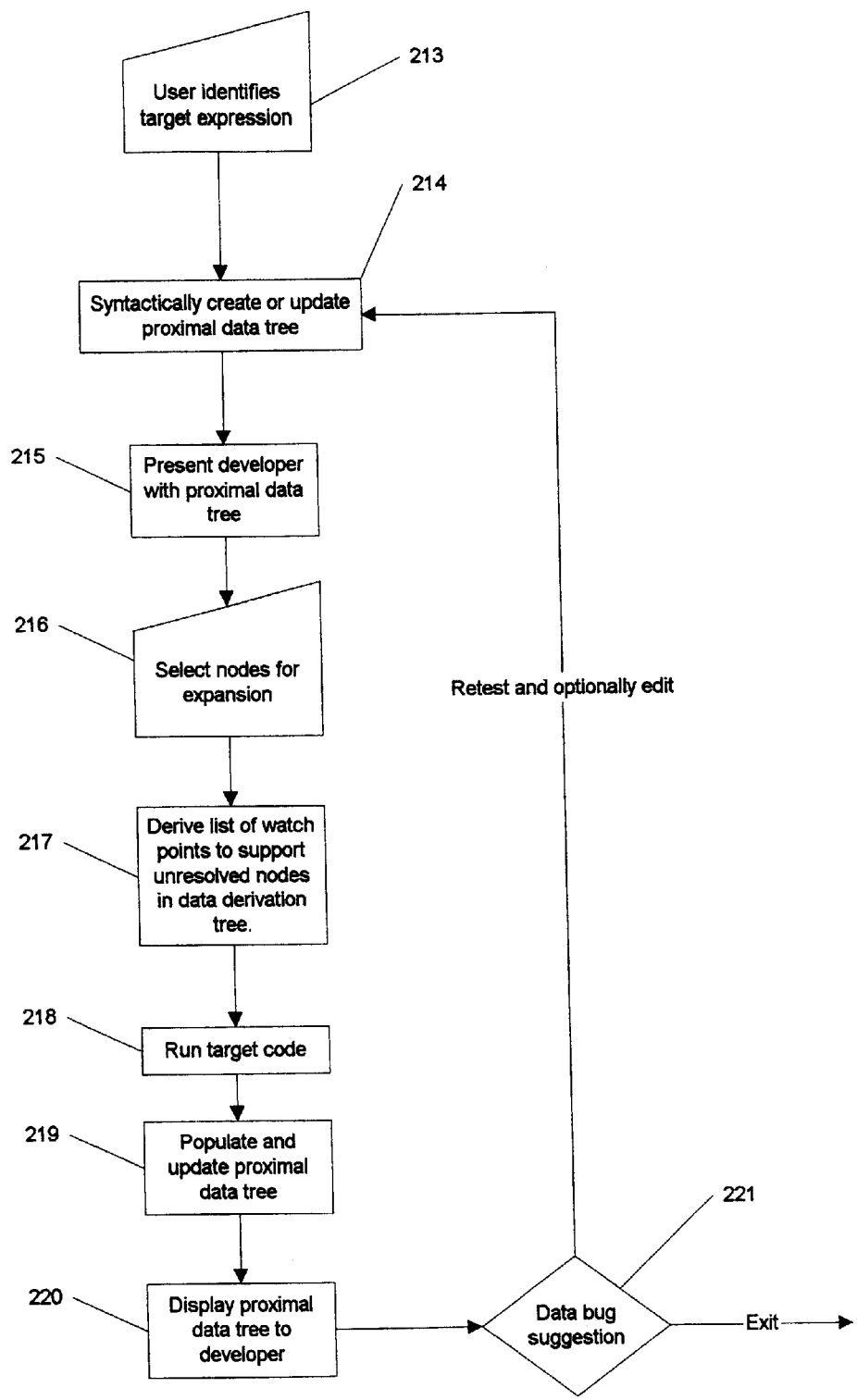
FIG. 24 shows a flow chart illustrating an overview of the creation and operation of a data bug.

FIG. 24 shows an overview of the creation and operation of a data bug. A data bug is created when the developer clicks on a statement, which then becomes the target statement. The exemplary embodiment then asks the developer to construct an expression that is supposed to be true after the statement is executed (the target expression) 213. For example, a target statement "x=2*y" with the target expression "x< >2"would make sure that after x is computed make sure that isn't equal to two. If "x" is equal to two, the exemplary embodiment attempts to find out why.

The exemplary embodiment then parses the target expression 214. The key data structure is a data bug is the proximal data tree, which shows how the target expression was derived at run time. The proximal data tree is presented to the developer 215 who then requests an area of the tree for expansion 216. Parsing produces the initial proximal data tree. The root of the tree is the target expression. The children of this node are the elements of the expression. Each nodes in the tree, can be a (an)

1. Expression, which can be made up of other expressions as well the other four types of nodes. Expressions are non-terminals. Expressions are only resolved when all their children are.
2. Constant, which is automatically a resolved and a terminal node.
3. Variable, a terminal node which can only be resolved at run time or statically if all its constituent expressions are terminals.
4. Visible source, a node representing a return value from a procedure (method, property, function, etc.) whose source is part of the target code.
5. Opaque source, a node representing data that is not derived from the target code (e.g., data from the network, user input, system libraries, etc.).

Figure 25:
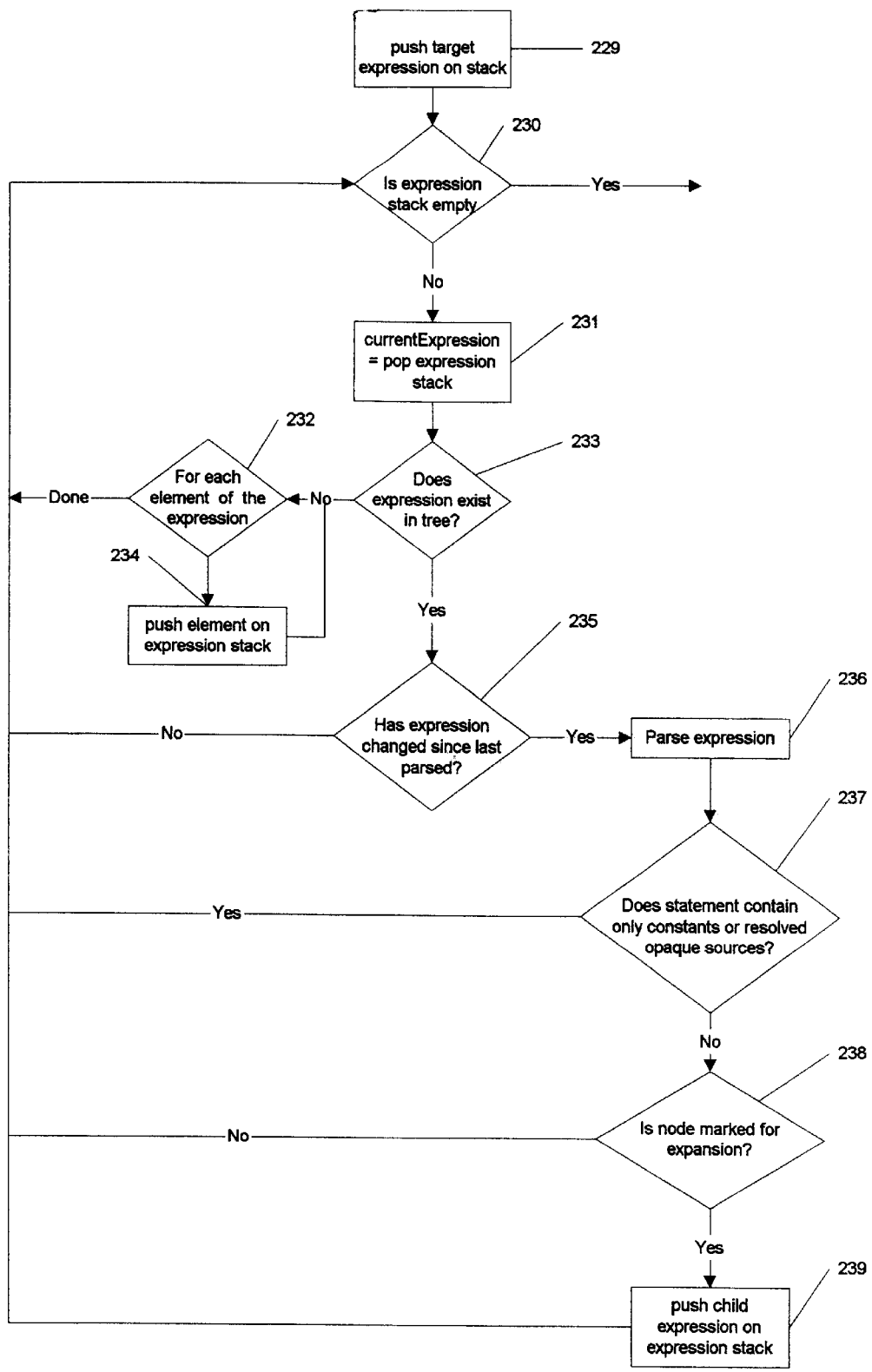
FIG. 25 shows a flow chart illustrating the creation and syntactic updating of the proximal data tree.

The invention recursively expands variables and visible sources to form a representation of how a particular value in a particular statement is derived. FIG. 25 shows the creation and syntactic updating of the proximal data tree. The proximal data tree is initially constructed by parsing the target expression. The tree is created by maintaining an expression stack, consisting of expressions be resolved. The exemplary embodiment begins by starting at the root node constructing the proximal data tree by pushing the target statement on the expression stack 229. While the expression stack is non-empty 230, the expression stack is popped 231. If the current expression exists in the proximal data tree 233, the expression is parsed into elements according to the rules described above. Each element from the new expression is pushed on the expression stack 232, 234.

If the expression exists in the proximal data tree, it's compared to the expression in the proximal data tree to see if the target code has changed since the last time the proximal data tree was derived 235. If the expression has changed, it is parsed 236. If the exemplary embodiment determines that the statement contains only constants or opaque sources 237, these nodes cannot be syntactically resolved, so no further processing is necessary. If the node has been marked by the developer for expansion 238, the child expressions (those that contribute to the current expression) are pushed on the expression stack 239.

Returning to FIG. 24, the exemplary embodiment presents the developer with the proximal data tree 215. The exemplary embodiment then displays the tree, highlighting unresolved, but resolvable nodes. The entire proximal data tree can experience a combinatoric explosion, which would not make bad data problems more, not less, difficult for a developer to visualize. Therefore, the developer selects the nodes to be expanded 216. These nodes contain either unknown or values that the developer wants to know more about.

Figure 26:
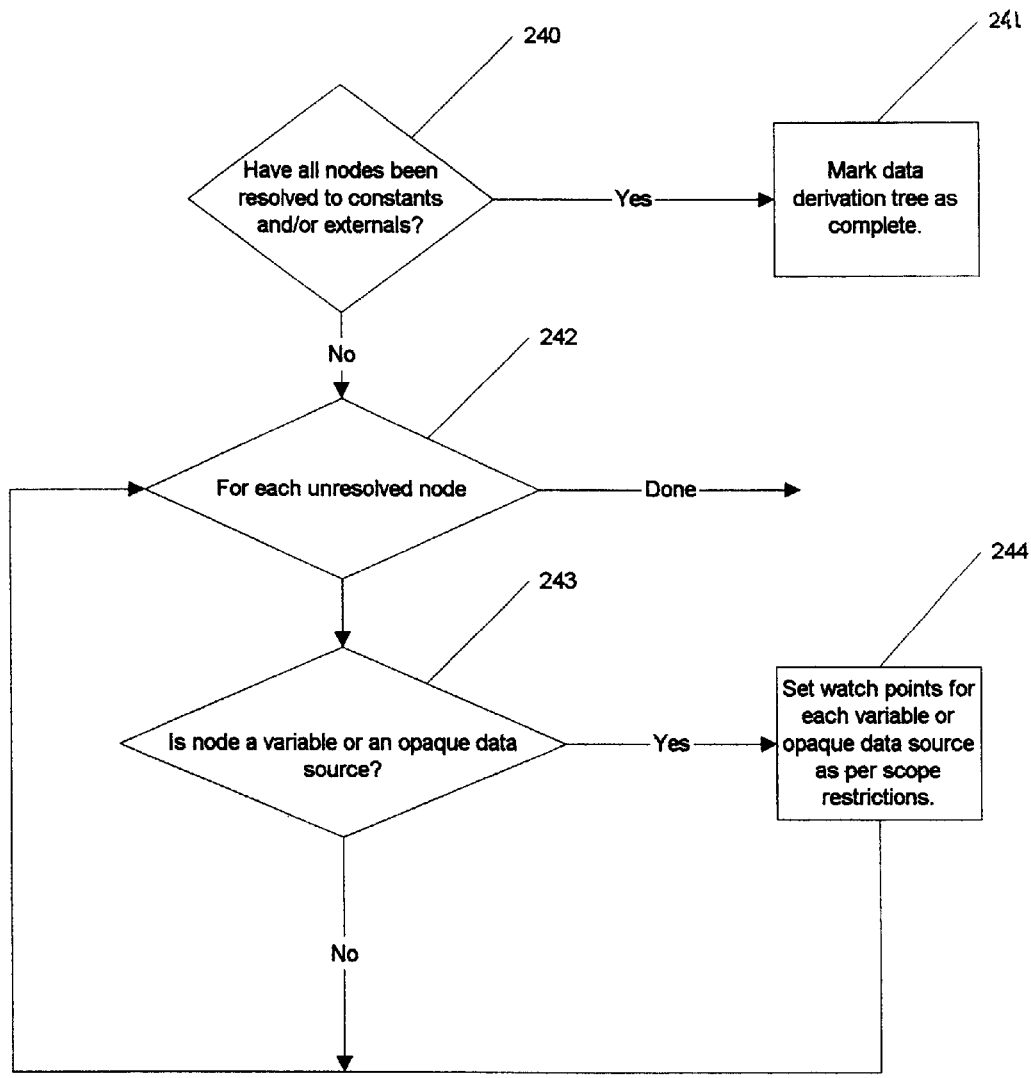
FIG. 26 shows a flow chart illustrating how the development environment is prepared to run the target code that populates the proximal data tree.

Once the developer has indicated how the proximal data tree should be expanded, the exemplary embodiment derives a list of watch points to support unresolved nodes in the proximal data tree 217. FIG. 26 details how the exemplary embodiment prepares the development environment to run the target code that populates the proximal data tree. If all nodes have been resolved 240, the proximal data tree is marked as complete 241 and no preparation is necessary. Otherwise, the exemplary embodiment iterates through all unresolved nodes 242. If a node is a variable 243, watch points are set for this variable in the development environment's debugger 244. A watch point is a debugger instruction that halts target code execution when the value of the watched expression changes. In the exemplary embodiment, the monitor process is notified when a watch point is activated.

Figure 27:
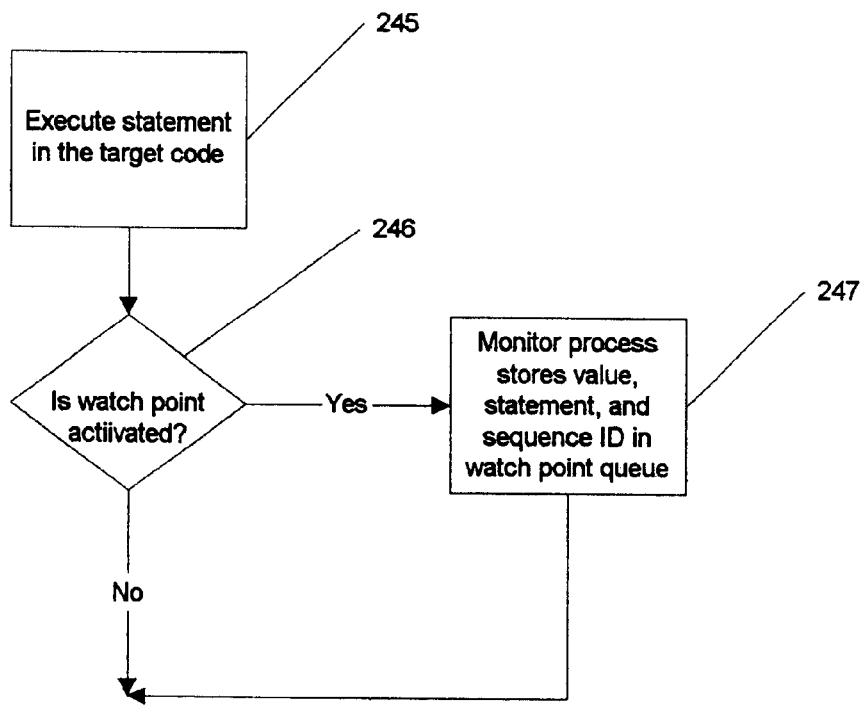
FIG. 27 shows a flow chart illustrating the detailed run-time mechanism for populating the proximal data tree at run-time.

Returning to FIG. 24, the target code is then run by the developer or exemplary embodiment 218. The proximal data tree is updated 219. FIG. 27 shows the run-time mechanism for populating the proximal data tree at run-time. After any statement is executed 245, a watch point may be activated 246. If it is, the monitor process queries the development environment and stores the value of the watched expression as well as the statement that activated the watch point 247. The values are sequenced so that causality may be displayed in the proximal data tree.

Figure 28:
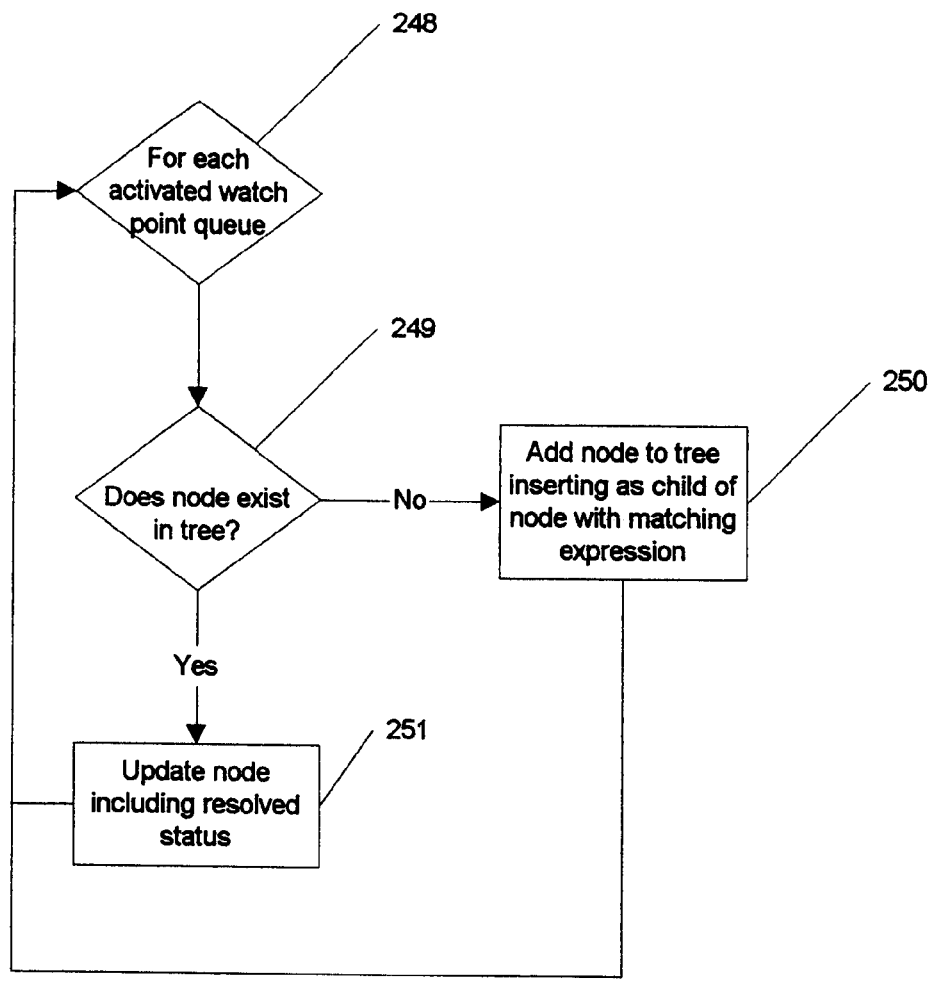
FIG. 28 shows a flow chart illustrating the developer's interaction with the proximal-data tree, after the target code has been run.

FIG. 28 shows the developer's interaction with the proximal data tree after the target code. has been run. The proximal data tree is updated with the run-time information from the monitor process. For each activated watch point 248, the exemplary embodiment checks if there is a node in the proximal data tree corresponding to the statement and item 249. If the node does not exist in the tree, a node is added to the tree. The new node is the child of the node with a matching expression 250. An expression is said to be matching if the expressions have the same text and scope. If there is a node in the tree, the value is updated and the node is marked resolved 251.

Returning to FIG. 24, once the proximal data tree is displayed 220, the developer can choose 221 to 1. Expand selected nodes.
2. Identify bad data sources.
3. Edit and Retest.

Figure 29:
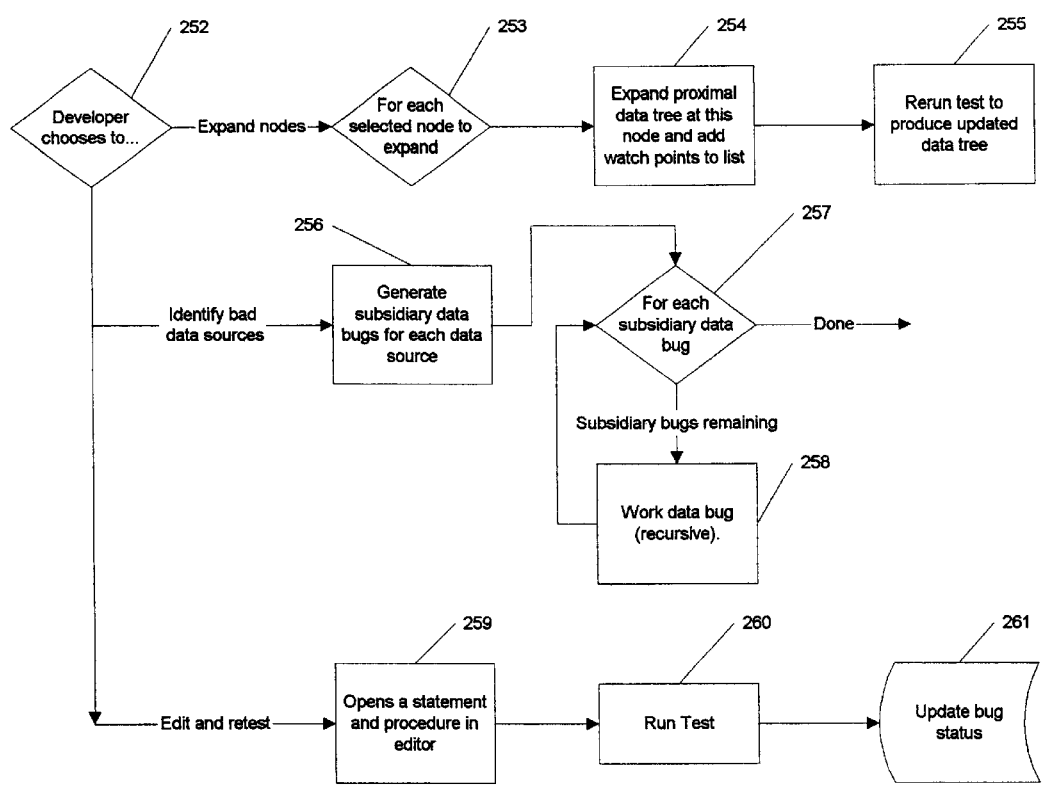
FIG. 29 shows a flow chart illustrating the developers interaction with the proximal data tree after the target code has been run.

The exemplary embodiment's response to these choices is given in FIG. 29. If the developer chooses to expand nodes 252, the exemplary embodiment iterates through each selected node. For each node 253, the exemplary embodiment determines the constituent expressions (those expressions which lead set variables or visible data sources in the parent expression). These constituent expressions are added to the proximal data tree 254. The test is then rerun to update the proximal data tree at run-time 255.

When the developer chooses to identify bad data sources 252, each highlighted expression itself becomes a subsidiary data bug 256. The exemplary embodiment then works each subsidiary data bug 257, which may give rise to recursive data bugs. These bugs are worked recursively until the original data bug is solved 258.

When the developer chooses to edit and retest 252, he presumably has a solution to the bug in mind. The developer then opens the appropriate procedure(s) and makes the edits 259. The test is then rerun 260. If the target expression is correct the bug is-marked as fixed, otherwise it remains open 261.

Revert Until Broken Bug

As mentioned above the finding and fixing of automatic bugs is extended by testing, which permits the invention to form and test hypotheses. The exemplary embodiment provides suites of tests and other types of tests, which will not be described here. The invention was designed to use test provided by Third Party Tools, provided they return a Boolean value indicating whether the test passed. A test is simply a regular test with an attribute in the data store marking it as a regression test.

Figure 30:
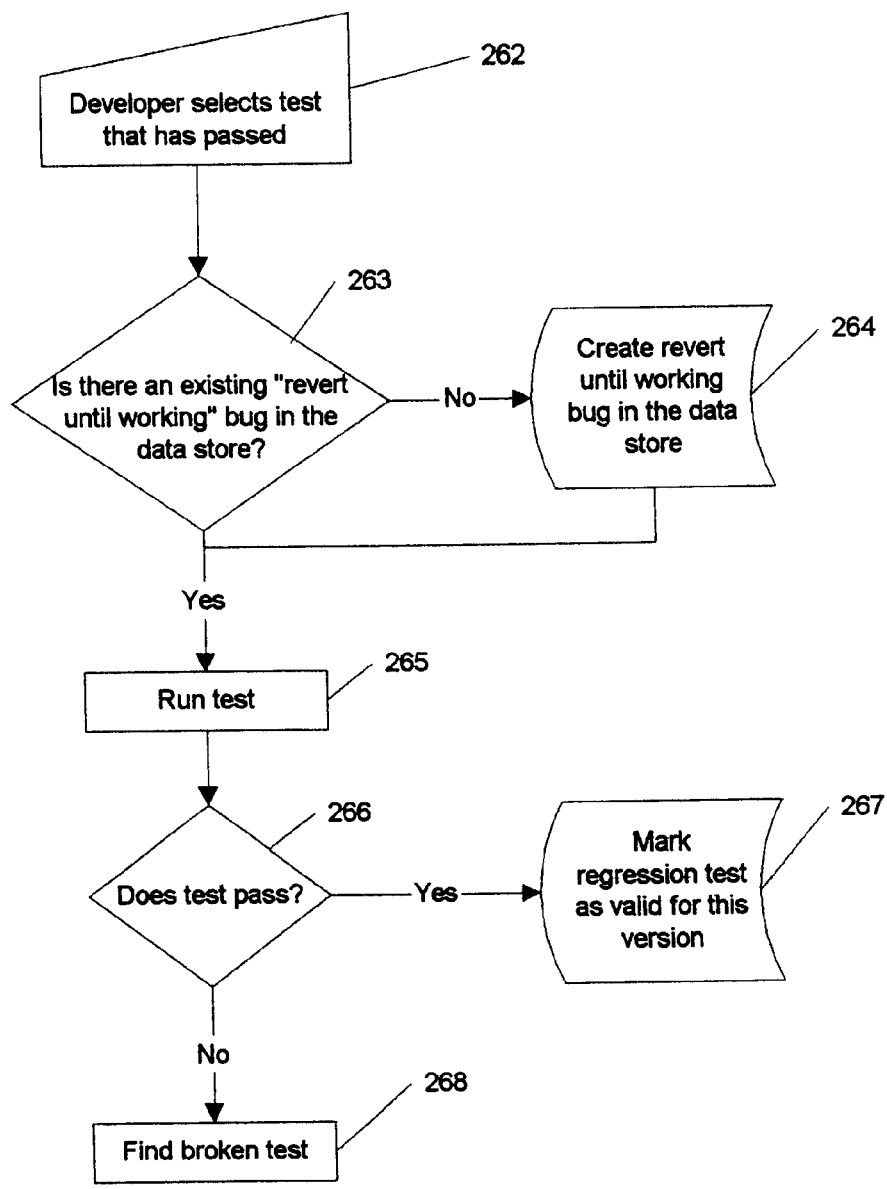
FIG. 30 shows a flow chart illustrating the operation of a "revert until broken" bug.

FIG. 30 shows the operation of a "revert until broken" bug. A revert until broken bug requires a passing test. The developer selects a test that has passed and uses this test to activate a new revert until broken bug 262. Is there isn't a revert until broken bug for the selected test 263, the exemplary embodiment creates one in the data store 264. These steps are shown to emphasize that there is one revert until broken bug per test per target code.

The exemplary embodiment now executes the test 265. If the test passes 266, the test corresponding to the bug is marked in the data store as fixed and the current version becomes the last working version 267.

If the test does not pass 266, the exemplary embodiment then searches the data store to obtain the version identifier of the target code that was used when the test last passed 268.

Figure 31:
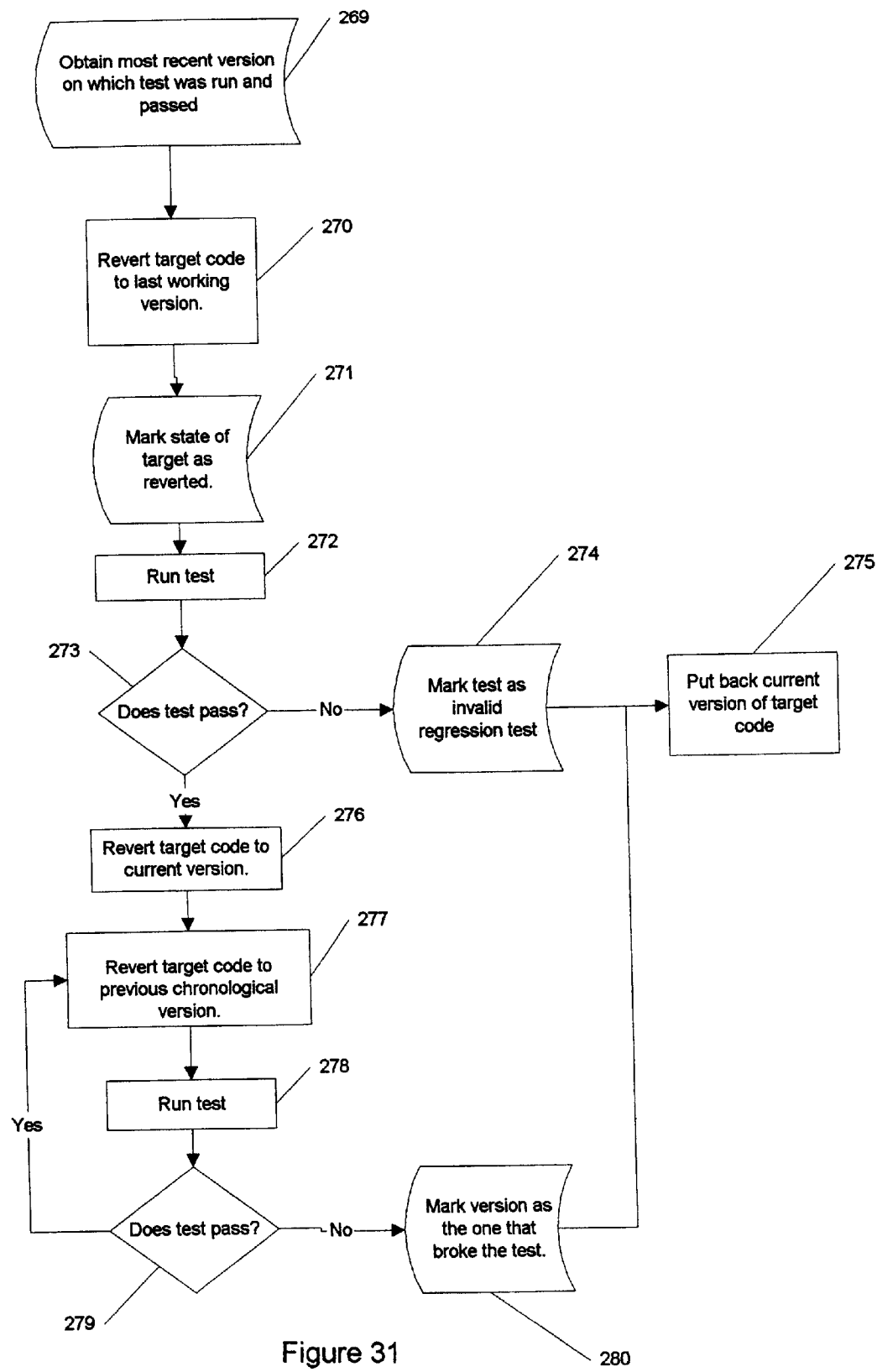
FIG. 31 shows a flow chart illustrating how a "revert until broken" bug finds the version that broke the test.

Finding the broken version is detailed in FIG. 31. The exemplary embodiment first obtains the version information from the data store 269. It then reverts the target code to the last working version by making the necessary additions, deletions, and modifications to the target code 270. The target code is marked as "reverted" 271 in the data store so the current code can be recovered if the developer wishes to interrupt the process or the development environment itself crashes.

The exemplary embodiment then runs the test with the reverted target code 272. If the test fails 273, the test is marked as an invalid regression test because it is not reproducible 274. The exemplary embodiment then returns the target code to its current version 275.

If the test passes 273, the exemplary embodiment puts the code back to the current version 276 and begins a loop to discover the version that broke the test. The loop begins by reverting the target code to the previous chronological version 277. The test is run 279. If the test fails 279, the exemplary embodiment marks the version as the one that broke the test 280. Otherwise, the loop repeats beginning at block 277. The exemplary embodiment then returns the target code to its current version 275.

Night Jobs

Figure 32:
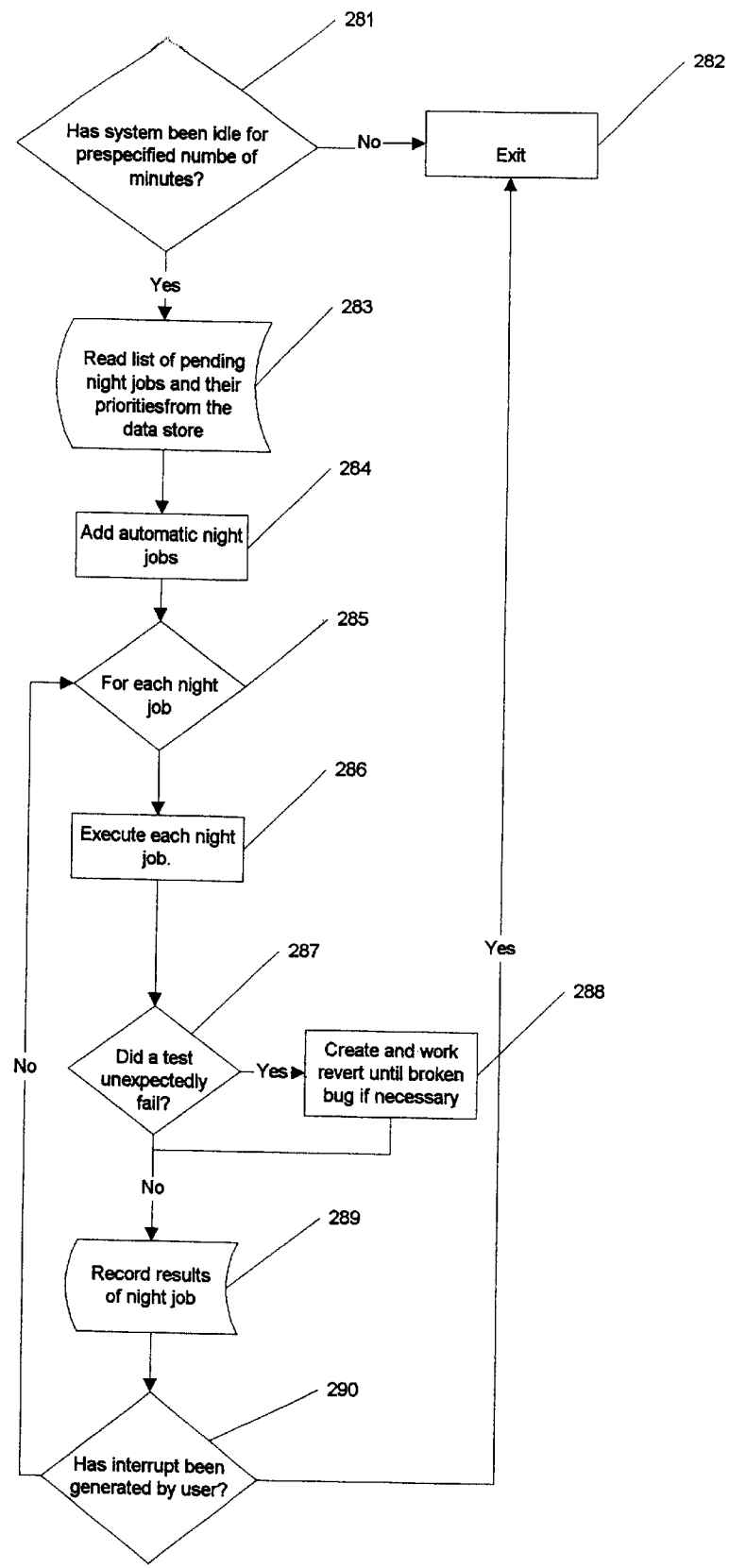
FIG. 32 shows a flow chart illustrating an overview of the night jobs mechanism.
Figure 33:
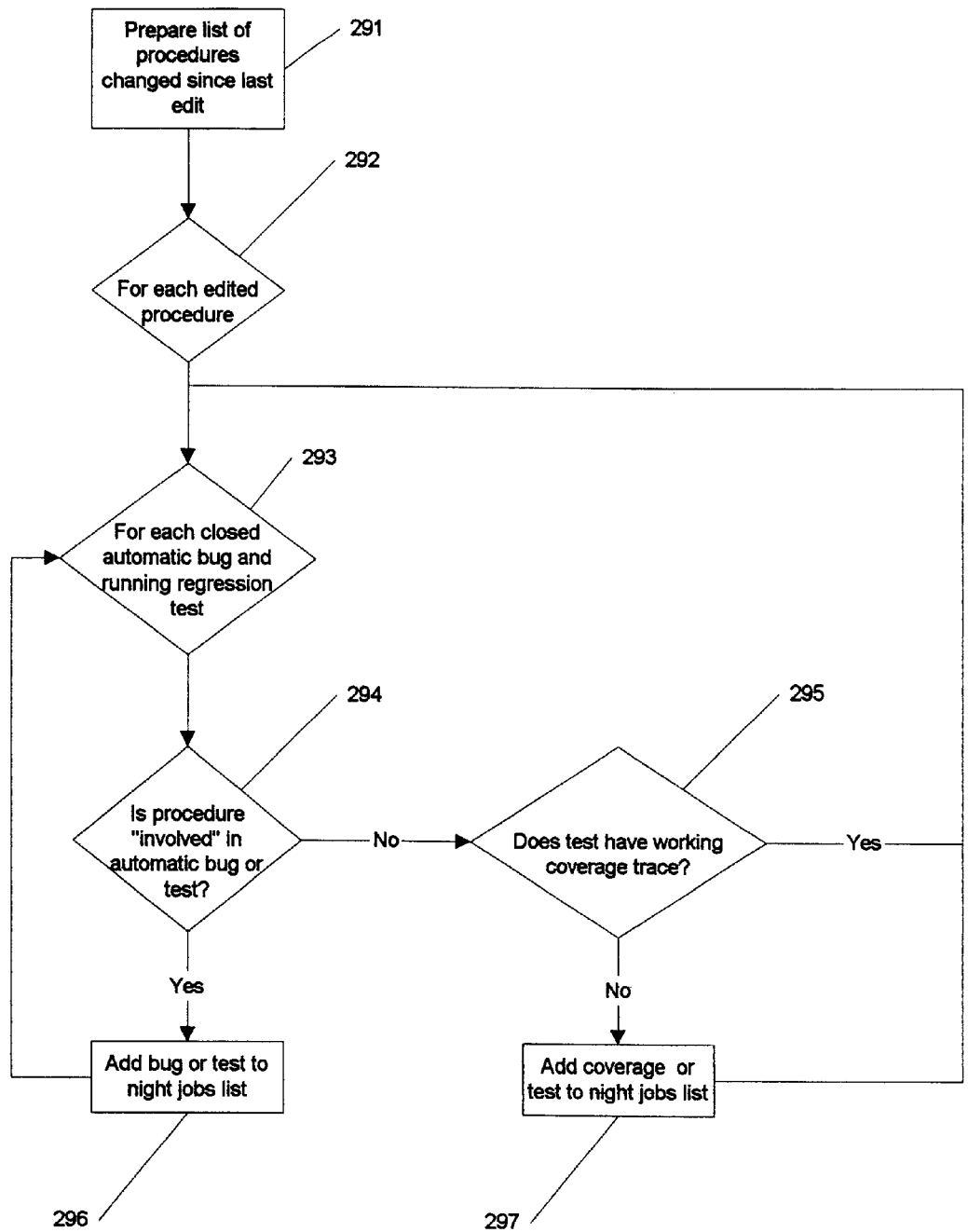
FIG. 33 shows a flow chart illustrating how automatic jobs are created.

Night jobs are tasks that check the target code when the developer is not using the computer. FIG. 32 shows an overview of the night jobs mechanism. The monitor process periodically checks if the developer's system is idle and has been idle for a specified time 281 (see FIG. 9, block 65). The exemplary embodiment also allows the developer to run night jobs without the system being idle by running a job directly from the night jobs form. The specified time defaults to two hours in the exemplary embodiment but this time is available for the developer to modify. If the system has been idle, the exemplary embodiment begins the night job process by reading the list of pending night jobs from the data store 283. The developer modifies the contents and priority of the pending night list by using the night jobs form. The exemplary embodiment adds automatic night jobs depending on the procedures the developer has edited 284, which is shown in FIG. 33. Night jobs added by the exemplary embodiment are called "automatic" night jobs. Automatic night jobs are explained in detail in the next section. Once a list of night jobs is obtained, the system iterates through the list in priority order 285, 286.

If a regression test run by a night job fails 287, the exemplary embodiment creates a "revert until broken" automatic bug to attempt to find the edit that broke a previously working test or fixed bug. The exemplary embodiment then schedules this "revert until broken bug" as a night job 288. The new job runs at the same priority as the test or bug that invoked it.

The exemplary embodiment records the results of each night job in the data store 289 for later review. The developer may interrupt any night job 290 if she returns to the computer before the night jobs list is exhausted.

Three types of night jobs are shown on the night jobs form in the exemplary embodiment:

1. Coverage is well understood technique of running a test and seeing which procedures are actually called. The exemplary embodiment uses its traceEnter and traceExit to instrument the code. The exemplary embodiment then runs a test and stores the list of called procedures in the data store as a "coverage trace".
2. Tests specified by the developer to be run when the system is idle.
3. Maintenance tasks, which in the exemplary embodiment include the ability for the developer to specify an executable, script, batch file etc. to be run.

FIG. 33 shows how automatic jobs are created. FIG. 33 is an expansion of item 284 in FIG. 32. The exemplary embodiment creates a list of procedures that have been edited since the last time the night jobs have been run 291. For each edited procedure 292, the exemplary embodiment executes a nested loop that iterates through a combined list of automatic bugs marked fixed and active regression tests 293.

In this loop, the exemplary embodiment checks if the procedure is "involved" in either an automatic bug or regression test 294. A procedure is "involved" in an automatic bug if it contains the target statement for a crash, loop, control flow, or data bug. A procedure is also involved in an automatic bug if it is in the automatic bug's proximal control trace or proximal data trace. If a test's "coverage trace" includes that procedure, the procedure is "involved" in that test. No procedure can be involved in a test if does not have a working (up-to-date) trace.

If the procedure is involved in a test or bug 294, that test or bug is scheduled as automatic night job 296. To make sure that tests and bugs have coverage traces, the exemplary embodiment schedules night jobs to obtain coverage traces for those tests and bugs that lack them 295, 297.

Figure 34:
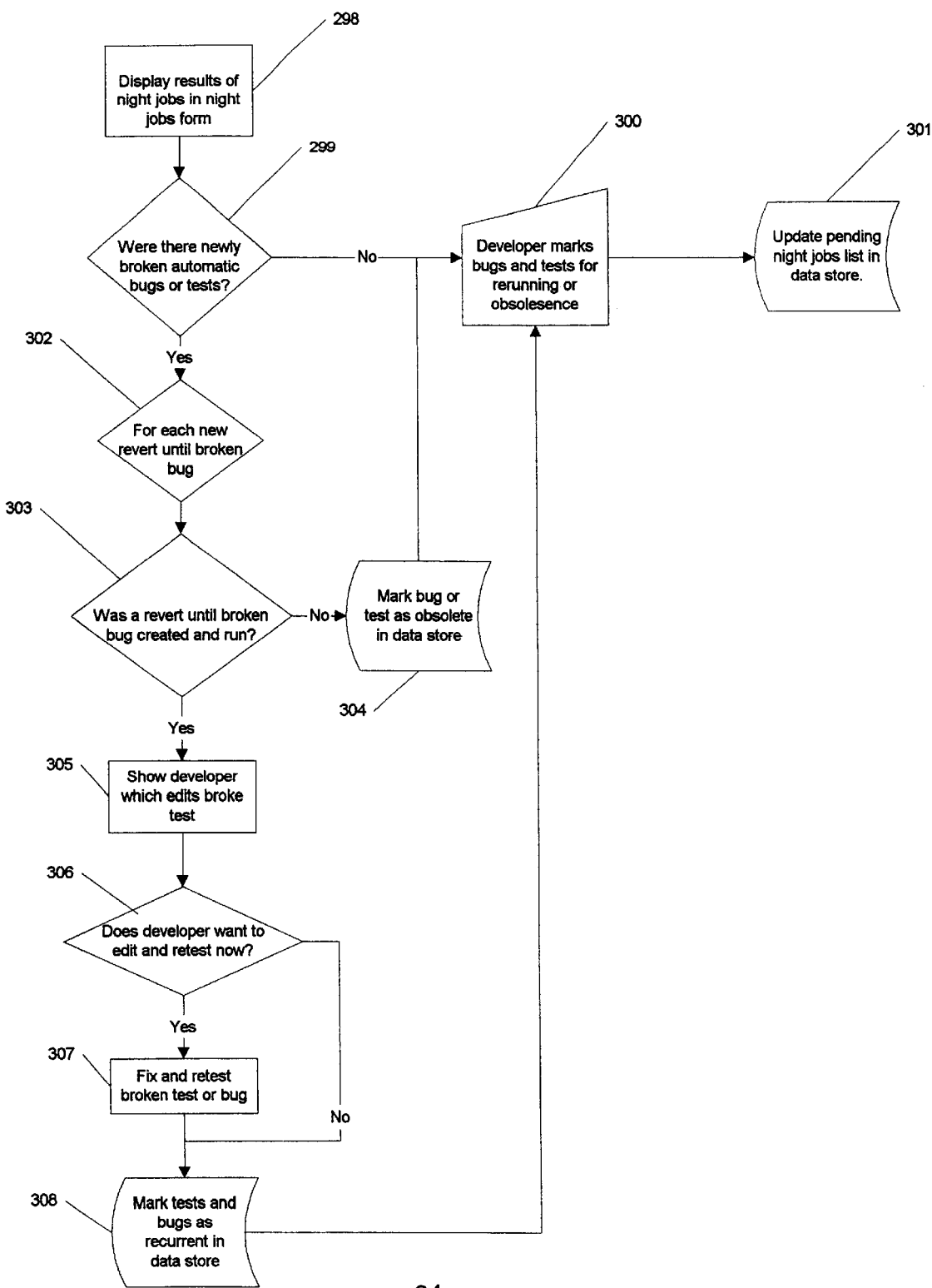
FIG. 34 shows a flow chart illustrating the night jobs report process.

FIG. 34 shows the night jobs report process. The developer uses the outcome of night jobs by activating the Night Job Results form 298. The exemplary embodiment checks to see if any of the automatic bugs or tests were newly broken 299. These tests and bugs were identified by block 284 in FIG. 32. For each broken test 302, the developer is informed of the "revert until broken bug". If the test didn't pass with the last good version of the code 303, the test is marked as obsolete 304. The test or bug's new status is reflected by changing the completion status on the corresponding task on the Living Gantt chart (if the test or bug is attached). The developer can override the invalid status of the test or bug manually 300.

If the revert until broken bug found that the last good version code caused the test or bug to run as expected, the developer is shown the set of changed modules and procedures that broke it 305. The developer is prompted to edit and retest so that the bug runs as expected with the current code 306. The developer can choose to edit and retest 307. The test or bug's is marked as recurrent in the data store 308. Recurrent bugs and tests are marked for display through the living Gantt chart 308.

After reviewing the status of night jobs, the developer can reschedule or mark obsolete night jobs from the previous session 300. These changes are noted in the data store 301.

Combined Bug List

Figure 35:
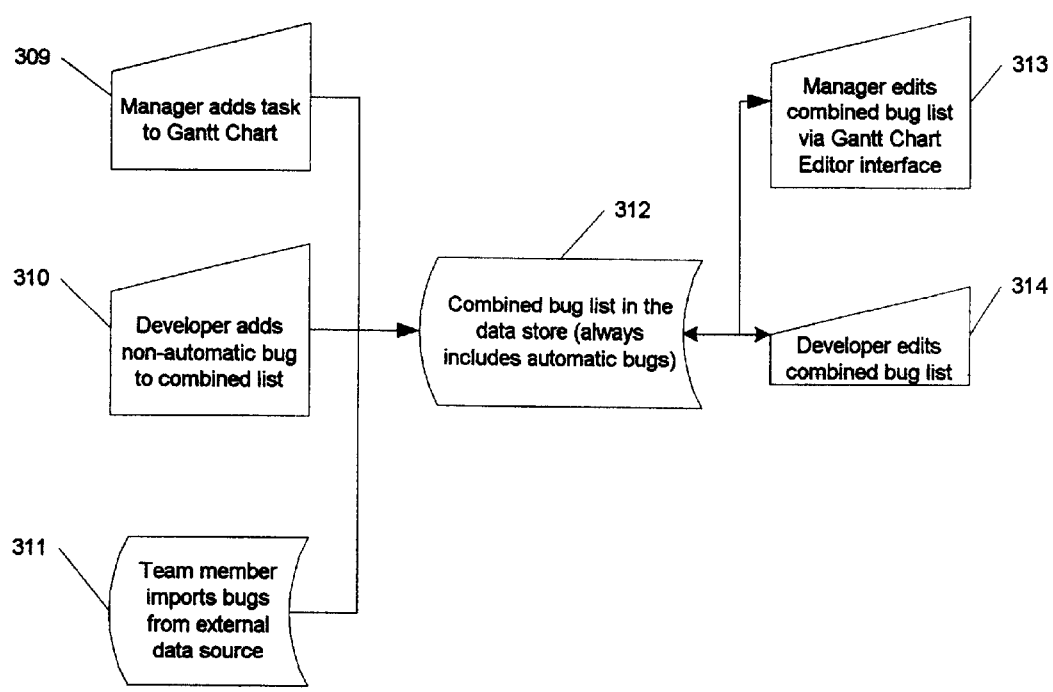
FIG. 35 shows a data diagram showing interactions with the combined bug list.

The invention provides forms for the developer or other external users to add bugs and feature requests to the data store. These items appear both to the developer as an "combined bug list" form and on the modified planning document. FIG. 35 shows how the combined bug list is maintained. Automatic bugs always appear on the combined list 312. However, the manager can mark selected tasks on the Gantt chart to be added to the combined bug list 309. Developers can use the combined bug list as a conventional electronic bug list, by adding text only (non-automatic bugs) 310. In addition, any team member (QA, other developer, etc.) can import bugs from other data stores into the combined bug list 311.

Besides simply adding to the combined list, both the developer and manager can edit items on the combined list, regardless of the source of the bug 313, 314. In the case of the manager, this capability is provided by adding an addition form to the Gantt chart Editor 313.

Transfer to Another Developer

Figure 36:
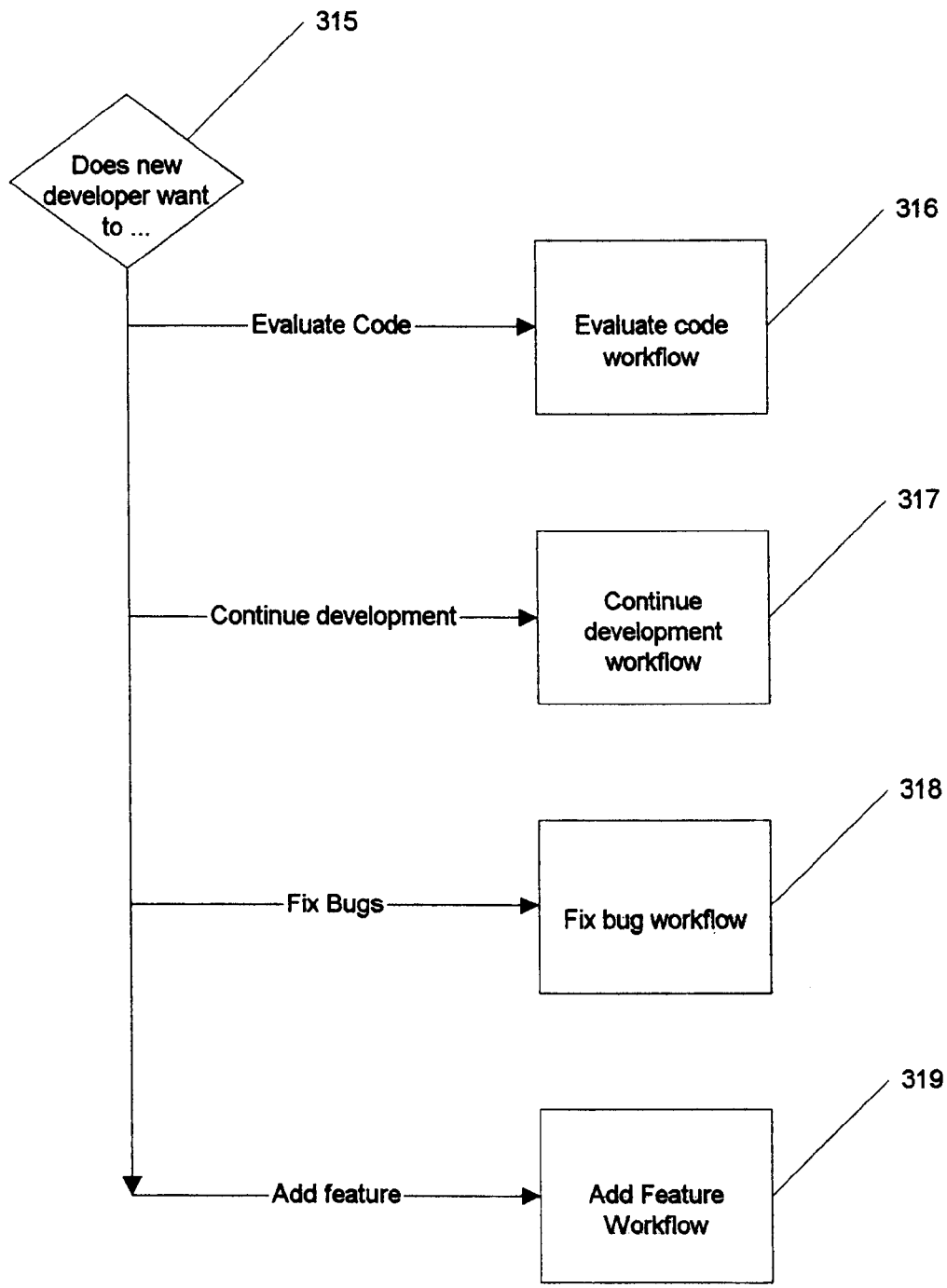
FIG. 36 shows a flow chart illustrating the four types of code transfer shown by the exemplary embodiment.

FIG. 36 shows the four types of code transfer explicitly supported by the exemplary embodiment. Code transfer is supported by forms 315 which allow a new developer to 1. Evaluate the state of the target code 316.
2. Continue development when the developer is not available to continue it 317.
3. Fix bugs 318.
4. Maintain existing code by extending its functionality 319.

These choices are not mutually exclusive. The new developer can apply any combination of these four to the same target code.

Figure 37:
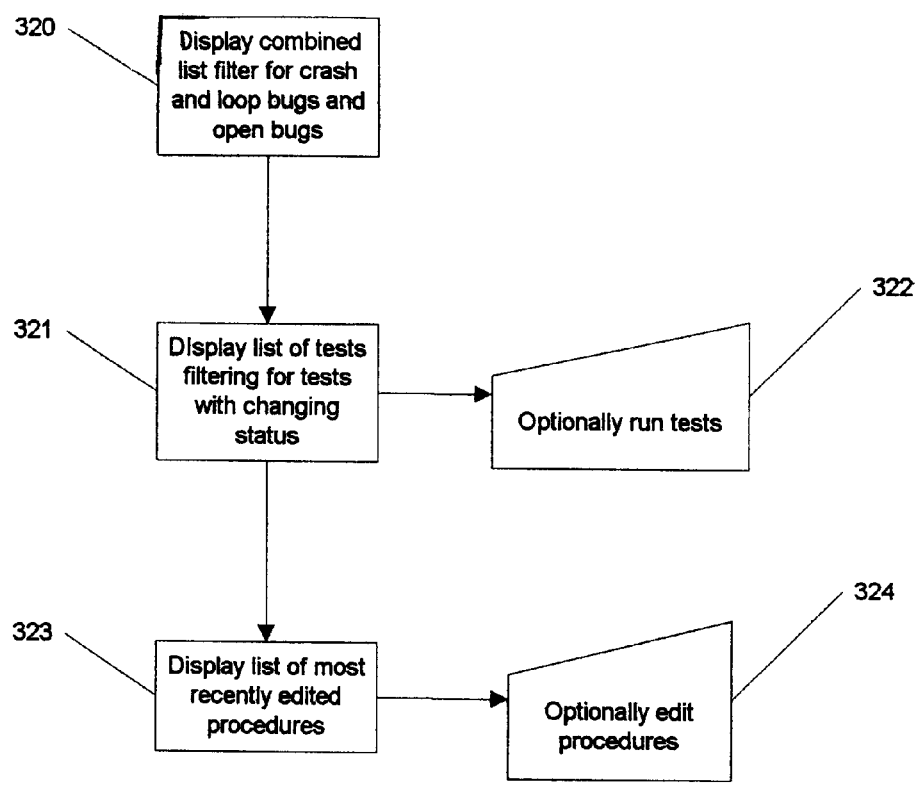
FIG. 37 shows a flow chart illustrating how the invention assists in the evaluation of the target code.

FIG. 37 shows how the invention assists in the evaluation of the target code. The new developer first displays the combined bug list and then filters for crash and loop bugs 320. Unsolved crash bugs indicate that the code is not ready for release and-provides tests and history for solving them. The new developer then filters for open bugs, including automatic bugs indicating what's being dealt with and when 320. Since tests are often implicit, the new developer can learn to run the target code, even if no documentation exists 321. These tests can be run from the exemplary embodiment's user interface 322. The new developer can filter for tests that failed, passed, and failed again. Tests with changing status suggest unstable underlying code. Next, the new developer is shown a list of most recently edited procedures quickly detailing what the previous developer was working on 323, as this code is least likely to be complete. The code is then available in the editor by selecting the procedure 324.

Figure 38:
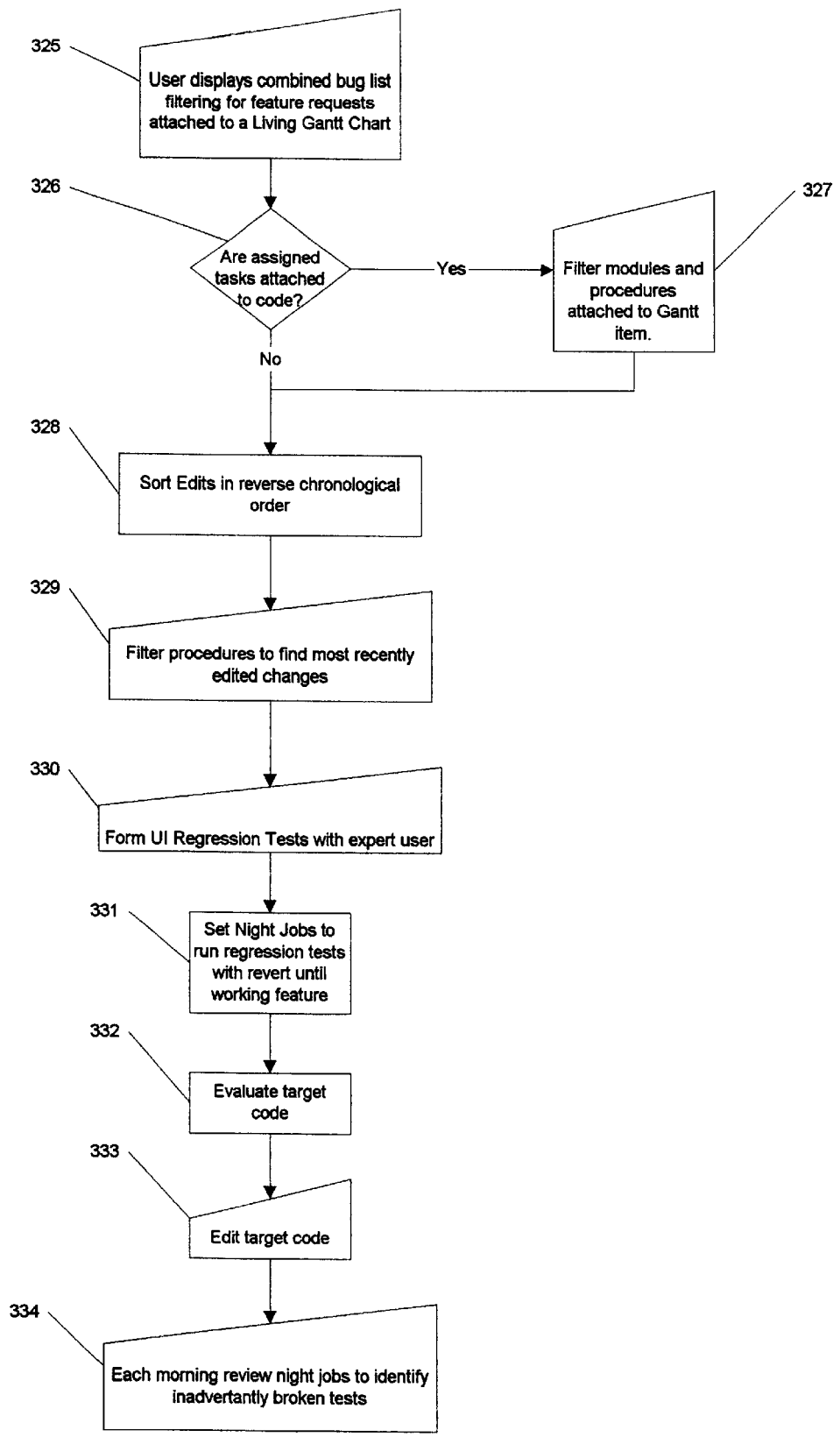
FIG. 38 shows a flow chart illustrating how the exemplary embodiment presents those tasks inherited from the combined bug list.

FIG. 38 shows how the exemplary embodiment presents those tasks inherited from the combined bug list. The exemplary embodiment provides a filter to show those tasks on the Living Gantt chart that are attached to code 325. If the code has been attached 326, then each feature is viewable as a package of procedures, modules, as well as automatic bugs, and tests 327.

The exemplary embodiment's Code City form displays the target code's procedures in reverse chronological order 328. The exemplary embodiment further accentuates recently development by showing different icons indicating how recently procedure was edited (1 day, 1 week, 1 month, and more than a month) 329. The Code City form also allows procedures to be filtered and sorted by size, author, and parent module. The exemplary embodiment then prepares the regression tests, allowing the new developer to form a baseline for working test. The quality of these regression tests is improved by having an experienced user of the target record Ul tests 330. The exemplary embodiment then sets night jobs to run regression tests (including the automatic formation of revert until broken bug for newly broken tests) 331. The developer can then evaluate the target code 332, which as described in FIG. 37. As the new developer continues to edit the target code 333, the night job mechanism described in FIGS. 32–34 shows the new developer what tests he has broken and what procedures and statements caused the problem 334.

Figure 39:
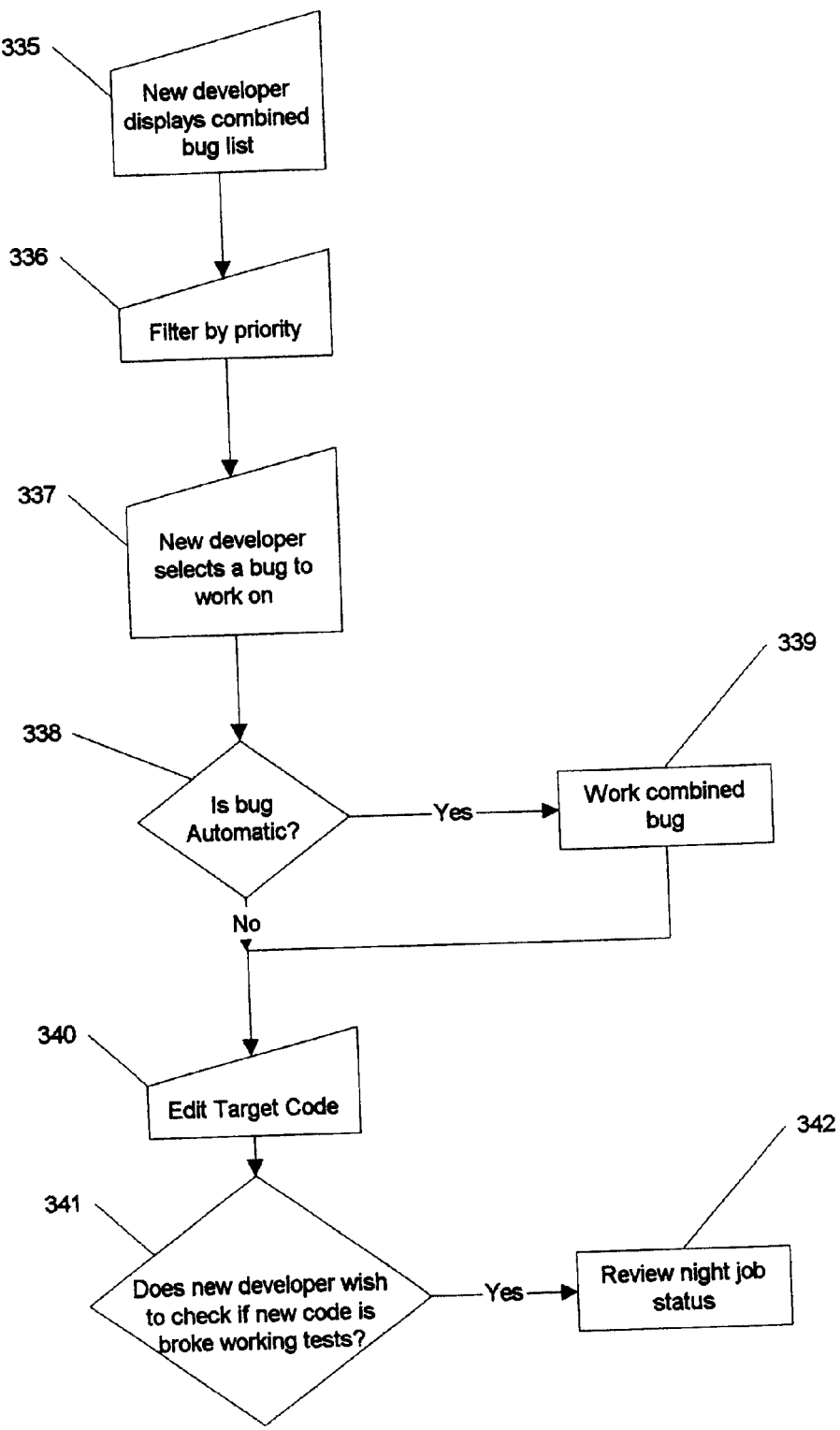
FIG. 39 shows a flow chart illustrating how the exemplary embodiment helps a new developer fix bugs in the target code.

FIG. 39 shows how the exemplary embodiment helps a new developer fix bugs in the target code. First, the developer displays the combined list 335. The new developer then filters the bug list by priority 336. The new developer then selects a bug 337. If the bug is an automatic bug 338, the exemplary embodiment guides the developer through the combined bug 339. The exemplary embodiment's bug detail form permits the transfer of a bug with its history, tests, and hypotheses for solution. Whether the bug is automatic or not, the new developer eventually edits the target code 340. The inadvertent breaking of working code is resisted by night jobs. Whenever the new developer, or the manager, wants to check if edits have broken working code 341, night jobs can be run (as described above) to generate and work revert until broken bugs 342.

Figure 40:
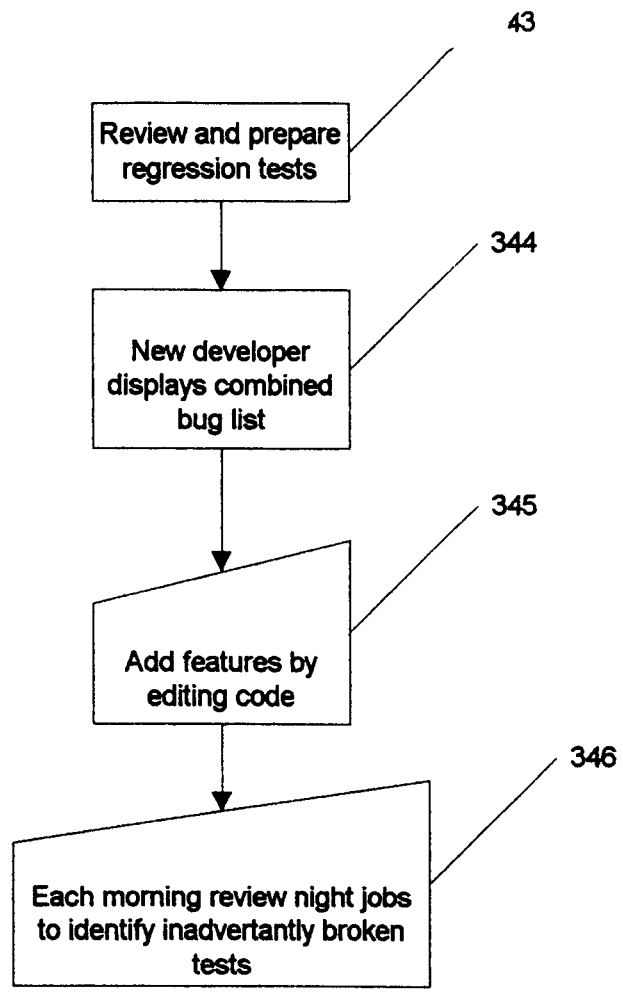
FIG. 40 shows a flow chart illustrating helping the developer add a new feature to the target code.

FIG. 40 shows how the exemplary embodiment helps the developer add a new feature to the target code. When the developer chooses to "Add a feature" from the exemplary embodiment's UI, the first step is to review the regression tests 343 and make sure they work, The new developer opens the combined bug list 344, which may contain items placed there by the manager via the Living Gantt interface. The developer then edits the target code to add the feature by editing code 345. Each morning the developer may review night jobs to identify inadvertently broken tests 346.

Connectivity to the Data Store

Finally, as the data store's schema is available, it can also be exported to other data stores which are compatible with other applications, providing more extensive access to the information collected by the exemplary embodiment.

Source Code for the Exemplary Embodiment

For reasons of length, source code for the exemplary embodiment is attached hereto as Exhibit 1, and is hereby incorporated herein, and in all related applications, in its entirety.

What is claimed is:

1. An integrated code and project management system for creating, editing, storing, and retrieving planning documents in a computer which has access to, on the same or different computer, where said computer has at least one instance of a software development environment including but not limited to a means of entering code, a method of translating said text into instructions, and a version management processor further comprising means for parsing each saved instance of the target code and retained information of module, file or class and logical program sub element, procedure, and storing the parsed code as well as the time and user identification assigned to the target code by the version identifier in the version management processor in a data store wherein said parsing to be automatically performed without additional effort, but allowing for general consent, of the developer; means for transforming the program organization into a planning document, derived planning document by creating a tree structure wherein each module of the target code is represented by a node which is a child of the node representing the entire target code and each procedure is represented by children of its node representing its containing module; means for responding to said transforming step, generating the derived planning document in a location where it can be further edited by a manager, that is a user of planning documents of a given format.

2. The system according to claim 1 wherein said step of generating a planning document further comprises means for generating target code structure such that said structures are browsable by managers such that individual target code elements can be selected; means for linking a subset of target code elements with a structured element, task, of a planning document; means for placing a representation of the derived planning document in the data store, including said links.

3. The system according to claim 2 wherein said step of generating target code structure into a planning document further comprises means for maintaining versions of the target code wherein individual version information for each module and procedure in the data store; means for permitting modified planning documents such that items in planning document corresponding to target code elements are maintained by the invention co-exist with items representing abstract, non-code, items derived from other manual or automatic means; means for using said links to maintain a derived planning document such that deletions, additions, and edits to the target code structure are reflected in a modified planning document.

4. The system according to 3 wherein the method of maintaining a planning document further comprises means for selecting procedures that have repeating version identifiers; means for selecting said procedure elements that have the most recent edits within a specified period; means for permitting display of the said procedures in the modified planning document by highlighting or otherwise modifying the display elements of the modified planning document linked to said procedures.

5. The system according to 3 wherein the method of maintaining a planning document further comprises means for selecting said procedure elements which have not been edited within a specified period; means for permitting display of the said procedures in the modified planning document by highlighting or otherwise modifying the display elements of the modified planning document linked to said procedures.

6. The system of claims 1, 3, 4 or 5 further comprising means for monitoring the run-time behavior of the target code, said means referred to as monitor, wherein said mechanism identifies when target code causes hardware and/or software elements of the computer system on which the target code is running generates a fault, exception, or error, collectively termed exception; means for recording exception information in the data store as a crash bug wherein said crash bug is identified by the exception code, module, procedure, and statement, target statement reported as causing the exception information; means for creating and maintaining an item in the modified planning document corresponding to the crash bug wherein crash bug is by default the child of the planning document item which represents the procedure where the exception occurred.

7. The system of claim 6 further comprising means for parsing a crash bug's target statement into its constituent elements, said parsing depending on the language in which the target statement was written; means for using said parsed and generating a hypotheses about the exception's cause, and optionally generating a modification to the target code, suggestion wherein said suggestion is made for the purpose of avoiding the crash bug's exception the next time the target code is executed, said means referred to as a language specific exception handler; means for invoking a specific language specific exception handler particular to the exception code which caused said crash bug.

8. The system of claim 7 further comprising means for recording the developer interface interactions proceeding an exception, wherein said interactions can be played back to regenerate the exception; means for placing said user interface interactions in the data store, wherein said interactions being referred to as an Implicit Ul test; means for creating and maintaining an item in the modified planning document corresponding to the Implicit Ul test.

9. The system of claim 3 or 8 further comprising means for instrumenting the-target coda such that procedure entry, exit, branch, loop, and optionally other instructions, wherein the execution of the instrumented code is reported to the monitor.

10. The system of claim 9 further comprising means for detecting how many times a loop has iterated, loop count, wherein distinct loop counts are maintained for each active loop; means for interrupting execution of the target code from the execution monitor when-the loop count exceeds a threshold, wherein said threshold is modifiable by the developer both in an overall and a per loop manner; means for recording said interruption in the data store; the entry being referred to as a loop bug.

11. The system of claim 10 further comprising means for the monitor to interrupt target code execution when a loop's count exceeds its threshold.

12. The system of claim 11 further comprising means for determining the controlling variable in the loop by static analysis of the target code controlling the repeated execution of the code; means for analyzing and generating a hypotheses about why a loop is endless; means for displaying said hypotheses and providing the developer the option of resetting the loop's threshold, editing the target code, or ignoring loop checking; means for recording the developer's response in the data store.

13. The system of claim 8 or 11 further comprising means for determining the status of the loop bug at a later time with the corresponding Implicit Ul Test; means for recording the results of software external-to both the system and the target code as tests, provided said tests indicate whether they passed or failed.

14. The system of claim 13 further comprising means for identifying a target statement in the target code which the developer believes should be executed when developer specified tests are run, wherein said target statement along with its tests, enclosing procedure and module define a control flow bug; means for selectively recording control flow and data information-reported by instrumentation such that the control flow statements that the flow of control both between and within procedures can be reconstructed said reconstruction be referred to as a proximal control trace.

15. The system of claim 14 further comprising means for determining the number of intervening branches between the proximal control trace and the target statement if the proximal trace shows that execution has occurred within the target procedure; means for identifying and instrumenting explicit calls to the target procedure from other procedures in the target code if the proximal trace shows that execution has not occurred within the target procedure.

16. The system of claim 15 further comprising means for generating a hypothesis about which branch in the target procedure must be executed, wherein said branch might be a traditional branch or unexpected control flow resulting from error handling, for the target statement to be executed; means for suggesting how the statement containing said branch should be changed wherein the modifications to said branch would cause the next proximal control trace to have fewer intervening branches between its furthest extent and the target statement; means for suggesting the recursive generation subsidiary control flow bugs to find why statements calling the target procedure were not executed.

17. The system of claim 16 further comprising means for displaying said hypotheses and suggestions of claims 14 and 15 to the developer, as well as options for, which include but are not limited to, editing the target code and stopping execution; means for making modification in the text and/or execution state of the target code depending on the option chosen by the developer; means for recording the developer's response in the data store.

18. The system of claim 8, 11 or 17 further comprising means for identifying a target expression in the target code which the developer believes should have a specified value or set of values when developer specified tests are run, wherein said target statement along with its test, enclosing procedure and module define a data bug; means for selectively recording control flow and data information reported by instrumentation such that the statements that contributed constituent elements of the target expression most proximal in reverse order of execution to the target statement are recorded wherein the run time values of said constituent elements can be represented as to show their derivation order in the proximal data tree; means for displaying the proximal data tree such that it emphasizes the value of the expressions that are being executed and so show how the value of the target expression was derived.

19. The system of claim 16 further comprising means for providing user-guided recursive expansion and updating of the unresolved nodes in the proximal data tree until the developer decides to make a correcting edit; means for recording the developer's responses and edits in-the data store; means for repeating this process until the test corresponding to the target expression conforms to the control flow bug is passed.

20. The system of claim 8, 11, 17, or 19 further comprising means for iteratively testing versions against a test, said means for said test being referred to as a revert until broken bug; means for determining the most recent version of the target code wherein said tests stops functioning provided the test still passes on the last known passing version; means for restoring the target code to its current version, regardless of the test's status; means for displaying the differences between the version that broke the test and the version preceding said version to the developer as part of the results of said revert until broken bug.

21. The system of claim 8, 11, 17, 19 or 20 further comprising the step of making the history of an automatic bug, that is a crash bug, loop bug, control flow bug, data bug, or a revert until broken bug linked to a task in the planning document.

22. The system of claim 21 further comprising means for detecting that the developer's computer is idle; means for creating and operating a revert until working bug for all tests in the data store marked as regression tests; means for reporting the results of said tests and other developer defined tasks, night jobs, to the developer when the developer reactivates said computer.

23. The system of claim 22 further comprising means for cross-referencing automatic bugs and coverage traces with a list of procedures since the most recent invocation of night jobs resulting in a list of regression tests and automatic bugs which are then queued as night jobs.

24. The system of claim 23 further comprising means that permits users of the executable image of the target code, associated users who do not normally edit the planning document or target code to enter defects, extensions, crashes, exceptions, requests for enhancement, or other indirect for edits into one displayable data structure, the combined bug list; means for allowing the combined bug list to be both linked to the planning document and displayable and modifiable by the developer.

25. The system of claim 24 further comprising means for selecting, organizing, and reporting the history of items on the edited procedures in sequential order such that another developer can view the evolution of the target code.

26. The system of claim 25 further comprising means for exporting said data store to- any other device capable of importing data via structured query language, SQL.

27. The system of claim 26, wherein said planning document editor is Microsoft Project.

28. The system of claims 26 or 27, wherein the target code development environment is selected from the group of Microsoft Visual Basic, Microsoft Visual C++, and other similar language Microsoft development environments.

* * * * *